United States Patent
Sawada

(10) Patent No.: US 8,134,744 B2
(45) Date of Patent: Mar. 13, 2012

(54) METHOD FOR SETTING COLOR CONVERSION CONDITION FOR USE IN IMAGE FORMING DEVICE, AND IMAGE FORMING DEVICE

(75) Inventor: Kazuhide Sawada, Aichi-ken (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 1019 days.

(21) Appl. No.: 11/966,370

(22) Filed: Dec. 28, 2007

(65) Prior Publication Data

US 2008/0170249 A1 Jul. 17, 2008

(30) Foreign Application Priority Data

Dec. 28, 2006 (JP) ................. 2006-356210

(51) Int. Cl.
- H04N 1/54 (2006.01)
- H04N 1/56 (2006.01)
- H04N 1/60 (2006.01)
- G03F 3/00 (2006.01)
- G03F 3/10 (2006.01)
- G09G 5/06 (2006.01)

(52) U.S. Cl. ......... 358/1.9; 358/501; 358/504; 358/515; 358/518; 358/523; 358/524; 358/525; 382/162; 382/167; 345/591; 345/601; 345/602; 345/603; 345/604

(58) Field of Classification Search .................... 358/1.9, 358/501, 504, 515, 518, 523, 524, 525; 382/162, 382/167; 345/591, 601–604
See application file for complete search history.

(56) References Cited

U.S. PATENT DOCUMENTS

| | | | |
|---|---|---|---|
| 6,198,552 B1 * | 3/2001 | Nagae | 358/518 |
| 6,979,069 B2 | 12/2005 | Tamagawa | |
| 7,633,658 B2 * | 12/2009 | Tsuji | 358/518 |
| 7,944,584 B2 * | 5/2011 | Hagai et al. | 358/1.9 |
| 2002/0029715 A1 * | 3/2002 | Ogatsu et al. | 101/494 |
| 2003/0016862 A1 * | 1/2003 | Ohga | 382/162 |
| 2003/0072016 A1 * | 4/2003 | Dalrymple et al. | 358/1.9 |
| 2003/0133138 A1 * | 7/2003 | Namikata | 358/1.9 |
| 2003/0189716 A1 * | 10/2003 | Tsuji et al. | 358/1.9 |
| 2005/0206929 A1 * | 9/2005 | Tsuji | 358/1.9 |

(Continued)

FOREIGN PATENT DOCUMENTS

| | | |
|---|---|---|
| JP | 2000-227848 | 8/2000 |
| JP | 2003-125222 | 4/2003 |
| JP | 2003-143422 | 5/2003 |

(Continued)

*Primary Examiner* — King Poon
*Assistant Examiner* — Beniyam Menberu
(74) *Attorney, Agent, or Firm* — Scully, Scott, Murphy & Presser PC

(57) ABSTRACT

A method for setting a color conversion condition for use in an image forming device. The image forming device includes: a first color conversion unit that converts input image data into first output image data by using a first three-dimensional LUT; and second-first, second-second and second-third color conversion units for sequentially converting the input image data into intermediate image data α and β by using at least one LUT. The method includes: setting, in a form of values expressing a color conversion relationship on a second three-dimensional LUT, a relationship between the intermediate image data α and the intermediate image data β to ensure that first colorimetric data of an image formed on the basis of the first output image data is equal to third colorimetric data of an image that is formed on the basis of image data obtained by sequentially converting the same input image data.

12 Claims, 14 Drawing Sheets

U.S. PATENT DOCUMENTS

| | | | |
|---|---|---|---|
| 2006/0188157 A1* | 8/2006 | Kondo et al. | 382/167 |
| 2007/0091110 A1* | 4/2007 | Yamada | 345/589 |
| 2007/0253039 A1* | 11/2007 | Ariga | 358/518 |
| 2007/0296988 A1* | 12/2007 | Tsuji | 358/1.9 |

FOREIGN PATENT DOCUMENTS

| | | |
|---|---|---|
| JP | 2003-296087 | 10/2003 |
| JP | 2004-201173 | 7/2004 |
| JP | 2006-19937 | 1/2006 |

* cited by examiner

FIG.4(a)
$$\begin{pmatrix} C \\ M \\ Y \end{pmatrix} = \begin{pmatrix} 255-R \\ 255-G \\ 255-B \end{pmatrix}$$

FIG.4(b)
$$minK = min(C, M, Y)$$

FIG.4(c)
$$\begin{pmatrix} C' \\ M' \\ Y' \end{pmatrix} = \begin{pmatrix} C-minK \\ M-minK \\ Y-minK \end{pmatrix}$$

FIG.4(d)
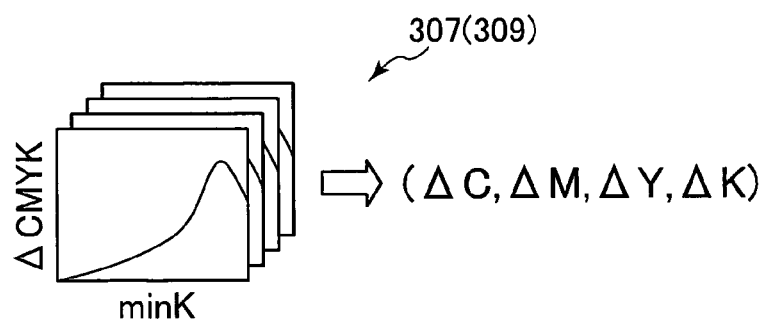
$\Rightarrow (\Delta C, \Delta M, \Delta Y, \Delta K)$

FIG.4(e)
$$\begin{pmatrix} C \\ M \\ Y \\ K \end{pmatrix} = \begin{pmatrix} C'+\Delta C \\ M'+\Delta M \\ Y'+\Delta Y \\ \Delta K \end{pmatrix}$$

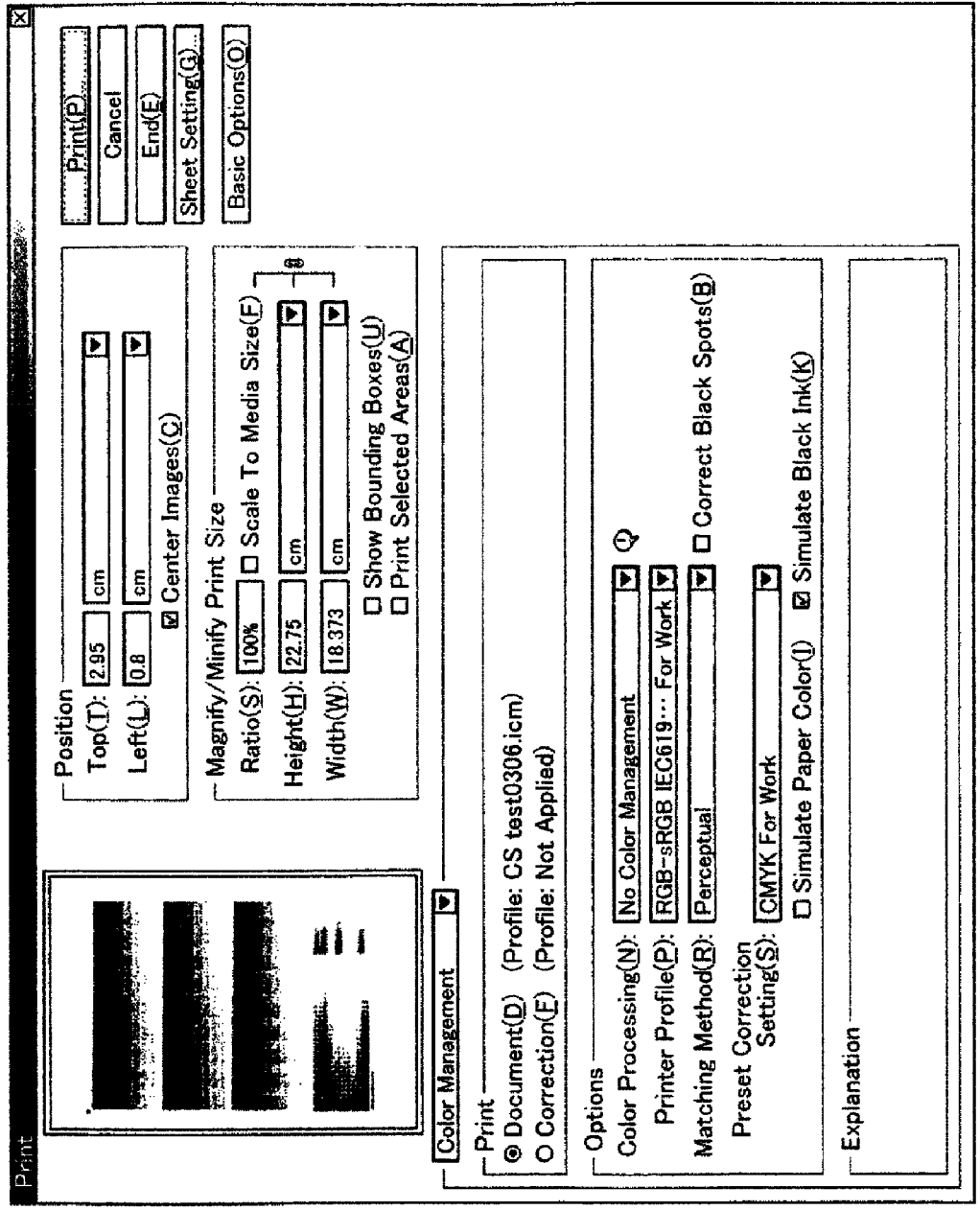

FIG.6
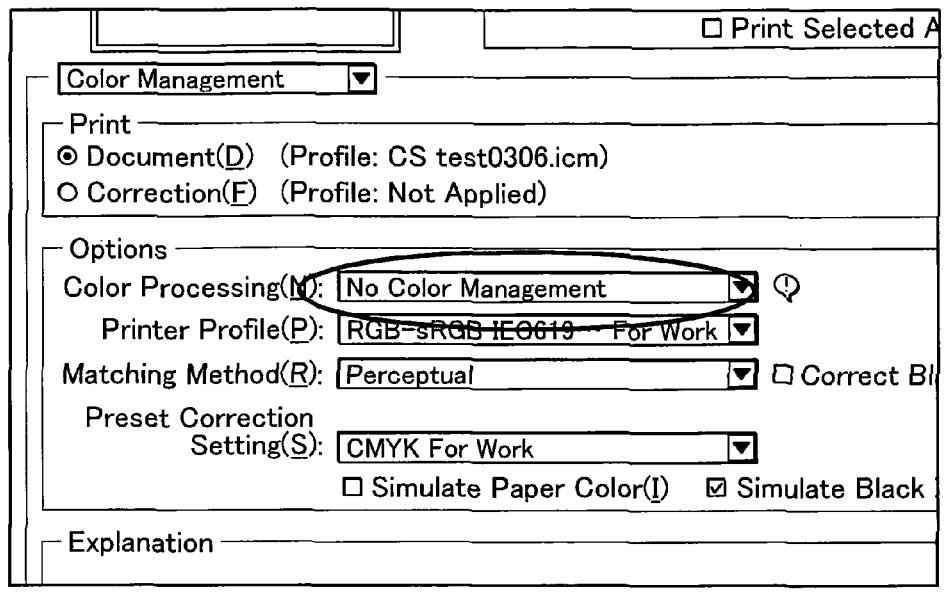
ROUTE 1 SELECTED
FIG.7
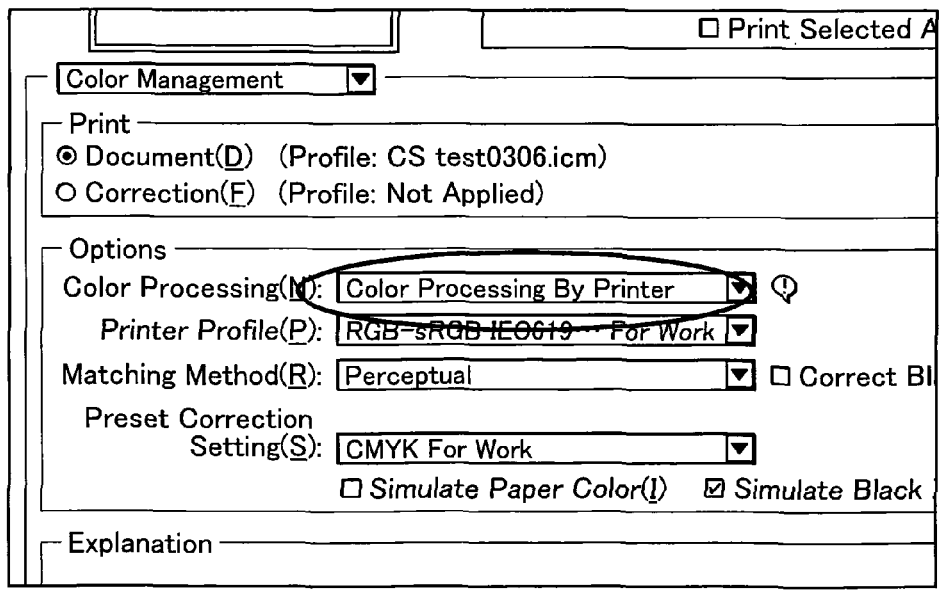
ROUTE 2 SELECTED

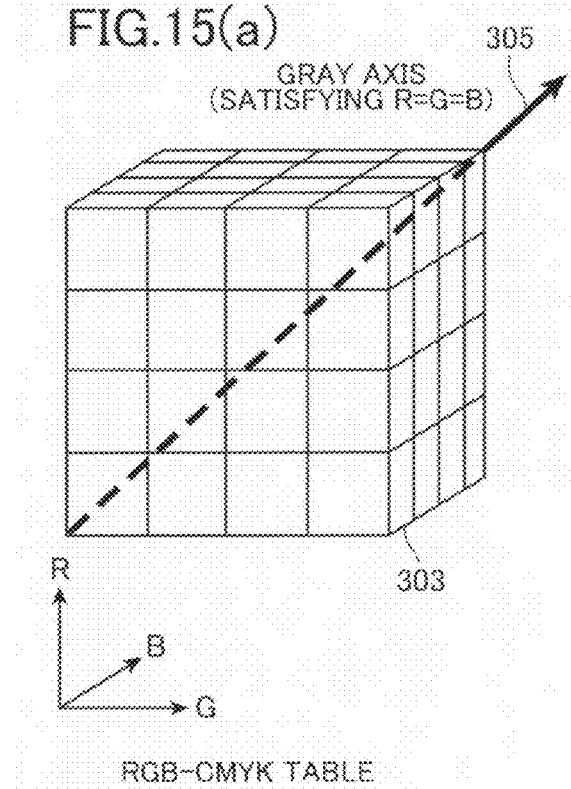
FIG.15(a) RGB-CMYK TABLE
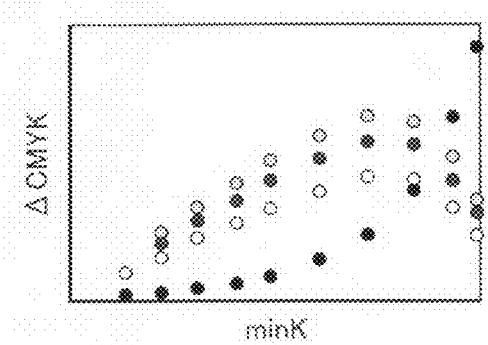
FIG.15(b)
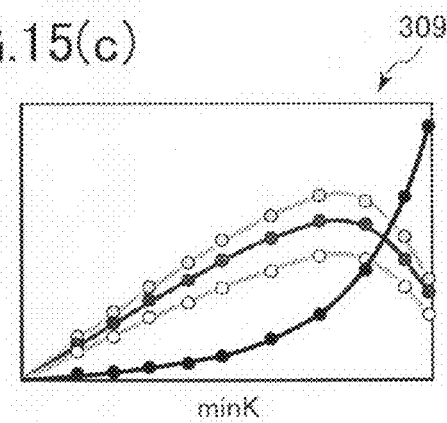
FIG.15(c)

METHOD FOR SETTING COLOR CONVERSION CONDITION FOR USE IN IMAGE FORMING DEVICE, AND IMAGE FORMING DEVICE

CROSS REFERENCE TO RELATED APPLICATION

This application claims priority from Japanese Patent Application No. 2006-356210 filed Dec. 28, 2006. The entire content of this priority application is incorporated herein by reference.

TECHNICAL FIELD

The present invention relates to an image forming device for converting input image data into output image data and for forming an image based on the output image data, and a method for setting a color conversion condition for use in the image forming device.

BACKGROUND

An image forming device, such as a color laser printer or an inkjet printer, receives input image data expressing color in a predetermined color space (e.g., RGB color space) from a personal computer (PC) or the like. The image forming device converts the input image data into output image data expressing color in a color space (e.g., a CMYK color space) other than the original color space. The image forming device forms an image based on the output image data.

SUMMARY

An image forming device is conceivable to have two color conversion units for converting input image data into output image data. The two color conversion units include: a first color conversion unit that performs a color conversion unique to the image forming device; and a second color conversion unit that is capable of setting a color conversion condition preferred by a user. The first and second color conversion units have different purposes, and accordingly perform completely different color conversions. The user can choose one of the first and second color conversion units in the application of PC.

In an application software, the first color conversion unit may be set as a standard color conversion unit. However, ordinary users will not be conscious of differences between the first and second color conversion units and therefore will not purposely carry out switching between the first and second color conversion units. As a result, ordinary users will use the first color conversion unit. People who use the second color conversion unit will only be a part of users, such as experts having expertise.

If the application software were designed so as to allow easy switching between the first and second color conversion units, users will possibly switch the first color conversion unit to the second color conversion unit without much understanding.

The first and second color conversion units respectively perform different color conversions. Therefore, if the first color conversion unit is mistakenly switched to the second color conversion unit, the user's expected colors will not be obtained.

In view of the above, an object of the present invention is to provide an image forming device that is capable of obtaining an image having the same colors as expected regardless of whether either of the first color conversion unit and second color conversion unit is selected by the user, and a color conversion condition setting method for the image forming device.

In order to attain the above and other objects, the present invention provides a method for setting a color conversion condition for use in an image forming device, the image forming device including: a first color conversion unit that converts input image data expressed in a RGB color space into first output image data expressed in a multicolor color space including C, M, Y, and K, by using a first three-dimensional LUT; a second-first color conversion unit that converts the input image data into intermediate image data α expressed in a device-independent color space, by using a predetermined conversion method, with a color conversion relationship between the input image data and the intermediate image data α being set as a color conversion relationship S; a second-second color conversion unit that converts the intermediate image data α into intermediate image data β expressed in the RGB color space, by using a second three-dimensional LUT; a second-third color conversion unit that converts the intermediate image data β into second output image data expressed in the multicolor color space including C, M, Y, and K, by using a conversion processing for conversion from the RGB color space into the multicolor color space including C, M, Y, and K without using a multi-dimensional LUT; and an image forming unit that is configured to form an image based on the first output image data if the image forming unit receives the first output image data and to form an image based on the second output image data if the image forming unit receives the second output image data. The method includes: obtaining a color conversion relationship X between the input image data and first colorimetric data of an image that is formed on the basis of the first output image data that is obtained by converting the input image data by the first color conversion unit; obtaining a color conversion relationship Y between the intermediate image data β and second colorimetric data of an image that is formed on the basis of the second output image data that is obtained by converting the intermediate image data β the same as the input image data by the second-third color conversion unit; and setting, in a form of values expressing a color conversion relationship on the second three-dimensional LUT, a relationship between the intermediate image data α and the intermediate image data β, by using the color conversion relationship S, the color conversion relationship X, and the color conversion relationship Y, to ensure that first calorimetric data of an image formed on the basis of the first output image data obtained by converting the input image data by the first color conversion unit is equal to third colorimetric data of an image that is formed on the basis of the second output image data obtained by sequentially converting the same input image data by the second-first color conversion unit, the second-second color conversion unit, and the second-third color conversion unit.

According to another aspect, the present invention provides an image forming device, including: a first color conversion unit; a second-first color conversion unit; a second-second color conversion unit; a second-third color conversion unit; and an image forming unit. The first color conversion unit converts input image data expressed in a RGB color space into first output image data expressed in a multicolor color space including C, M, Y, and K, by using a first three-dimensional LUT, a color conversion relationship X being defined between the input image data and first calorimetric data of an image formed on the basis of the first output image data. The second-first color conversion unit converts the input image data into intermediate image data α expressed in a device-independent color space, by using a predetermined conversion method, with a color conversion relationship between the input image data and the intermediate image data α being set as a color conversion relationship S. The second-second color conversion unit converts the intermediate image data α into intermediate image data β expressed in the RGB color space, by using a second three-dimensional LUT. The second-third color conversion unit converts the intermediate image data β into second output image data expressed in the multicolor color space including C, M, Y, and K, by using a conversion processing for conversion from the RGB color space into the multicolor color space including C, M, Y, and K without using a multi-dimensional LUT, a color conversion relationship Y being defined between the intermediate image data β and second colorimetric data of an image that is formed on the basis of the second output image data that is obtained by converting the intermediate image data β the same as the input image data by the second-third color conversion unit. The image forming unit is configured to form an image based on the first output image data if the image forming unit receives the first output image data and to form an image based on the second output image data if the image forming unit receives the second output image data. The second three-dimensional LUT indicates a relationship between the intermediate image data α and the intermediate image data β. The relationship between the intermediate image data α and the intermediate image data β is dependent on the color conversion relationship S, the color conversion relationship X, and the color conversion relationship Y, thereby ensuring that first colorimetric data of an image formed on the basis of the first output image data obtained by converting the input image data by the first color conversion unit is equal to third colorimetric data of an image that is formed on the basis of the second output image data obtained by sequentially converting the same input image data by the second-first color conversion unit, the second-second color conversion unit, and the second-third color conversion unit.

According to another aspect, the present invention provides a computer readable medium storing a set of program instructions executable on a data processing device and usable for setting a color conversion condition for use in an image forming device, the image forming device including: a first color conversion unit that converts input image data expressed in a RGB color space into first output image data expressed in a multicolor color space including C, M, Y, and K, by using a first three-dimensional LUT, a second-first color conversion unit that converts the input image data into intermediate image data α expressed in a device-independent color space, by using a predetermined conversion method, with a color conversion relationship between the input image data and the intermediate image data α being set as a color conversion relationship S; a second-second color conversion unit that converts the intermediate image data α into intermediate image data β expressed in the RGB color space, by using a second three-dimensional LUT; a second-third color conversion unit that converts the intermediate image data β into second output image data expressed in the multicolor color space including C, M, Y, and K, by using a conversion processing for conversion from the RGB color space into the multicolor color space including C, M, Y, and K without using a multi-dimensional LUT; and an image forming unit that is configured to form an image based on the first output image data if the image forming unit receives the first output image data and to form an image based on the second output image data if the image forming unit receives the second output image data. The instructions includes: obtaining a color conversion relationship X between the input image data and first colorimetric data of an image that is formed on the basis of the first output image data that is obtained by converting the input image date by the first color conversion unit; obtaining a color conversion relationship Y between the intermediate image data β and second calorimetric data of an image that is formed on the basis of the second output image data that is obtained by converting the intermediate image data β the same as the input image data by the second-third color conversion unit; and setting, in a form of values expressing a color conversion relationship on the second three-dimensional LUT, a relationship between the intermediate image data α and the intermediate image data β, by using the color conversion relationship S, the color conversion relationship X, and the color conversion relationship Y, to ensure that first colorimetric data of an image formed on the basis of the first output image data obtained by converting the input image data by the first color conversion unit is equal to third calorimetric data of an image that is formed on the basis of the second output image data obtained by sequentially converting the same input image data by the second-first color conversion unit, the second-second color conversion unit, and the second-third color conversion unit.

BRIEF DESCRIPTION OF THE DRAWINGS

The particular features and advantages of the invention as well as other objects will become apparent from the following description taken in connection with the accompanying drawings, in which:

FIGS. 4(a) to 4(e) explain a method of converting intermediate image data β into second output image data D3 that is expressed in a CMYK color space by using UCR/GCR one-dimensional tables, wherein FIG. 4(a) shows how to determine CMY values from RGB values, FIG. 4(b) shows how to determine "minK" based on CMY values, FIG. 4(c) shows how to determine C'M'Y' values from CMY values and minK value, FIG. 4(d) shows how to determine ΔC, ΔM, ΔY, and ΔK values based on the minK value, and FIG. 4(e) shows how to determine CMYK values based on the C'M'Y' values and the ΔC, ΔM, ΔY, and ΔK values;

FIG. 5 is an explanatory diagram showing an operation screen displayed on a display of the personal computer when a user desires to input to the printer input image data generated by the personal computer;

FIG. 6 is also an explanatory diagram showing a part of the operation screen of FIG. 5 when the user selects no color management;

FIG. 7 is also an explanatory diagram showing the part of the operation screen of FIG. 5 when the user selects color processing by the printer;

FIGS. 11(a) to 11(d) are explanatory views showing a method for obtaining an inverse conversion table $X^{-1}$ wherein FIG. 11(a) shows a color conversion table X, FIG. 11(b) shows a resultant color conversion table X after the color conversion table X of FIG. 11(a) has been subjected to an interpolation process, FIG. 11(c) shows a state in which values of L, a*, and b* on RGB grids of the color conversion table X are mapped into a L*a*b* color space, and FIG. 11(d) shows how the values of L, a*, and b* on the RGB grids are distributed in the L*a*b* color space;

FIGS. 13(a) and 13(b) are explanatory views showing a second three-dimensional LUT when the second three-dimensional LUT has an odd number of grids, wherein FIG. 13(a) is a perspective view of the second three-dimensional LUT and FIG. 13(b) is a plan view of the second three-dimensional LUT seen from L-axis direction;

FIGS. 14(a) and 14(b) are also explanatory views showing a second three-dimensional LUT when the second three-dimensional LUT has an even number of grids, wherein FIG. 14(a) is a perspective view of the second three-dimensional LUT and FIG. 14(b) is a plan view of the second three-dimensional LUT seen from L-axis direction; and FIGS. 15(a) to 15(c) explain the gray axis correction processing wherein FIG. 15(a) is a perspective view of a first three-dimensional LUT, FIG. 15(b) shows a process of extracting C, M, Y, and K from the first three-dimensional LUT at their grids located an the gray axis and arranging the extracted values C, M, Y, and K, and FIG. 15(c) shows a process of generating additional UCR/GCR one-dimensional tables by connecting values of C extracted from the first three-dimensional LUT, by connecting values of M extracted from the first three-dimensional LUT, by connecting values of Y extracted from the first three-dimensional LUT, and by connecting values of K extracted from the first three-dimensional LUT.

DETAILED DESCRIPTION

Figure 1:
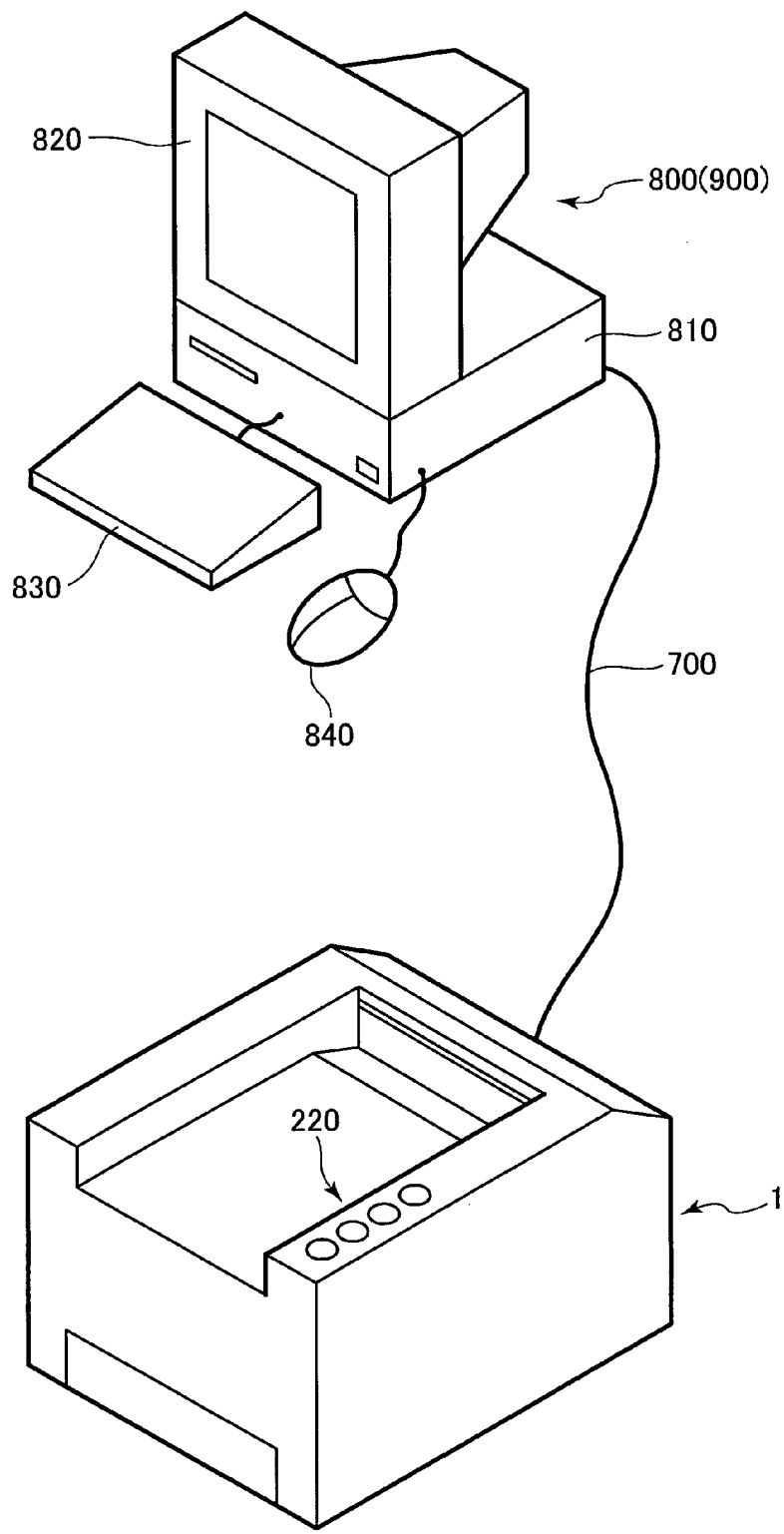
FIG. 1 is a perspective view showing an external appearance of a printer and a personal computer according to an embodiment of the present invention.

An image forming device and a color conversion condition setting method for the image forming device according to an embodiment of the invention will be described while referring to the accompanying drawings wherein like parts and components are designated by the same reference numerals to avoid duplicating description.

The structure and operation of a color laser printer (hereinafter simply referred to as a printer) 1 according to an embodiment of the present invention will be described first with reference to FIGS. 1 to 7.

FIG. 1 shows an external appearances of the printer 1 and a personal computer (hereinafter PC) 800. As shown in FIG. 1, the printer 1 is connected to the PC 800 through a cable 700. Alternatively, the printer 1 and PC 800 may be connected to each other through a network such as a LAN.

Figure 2:
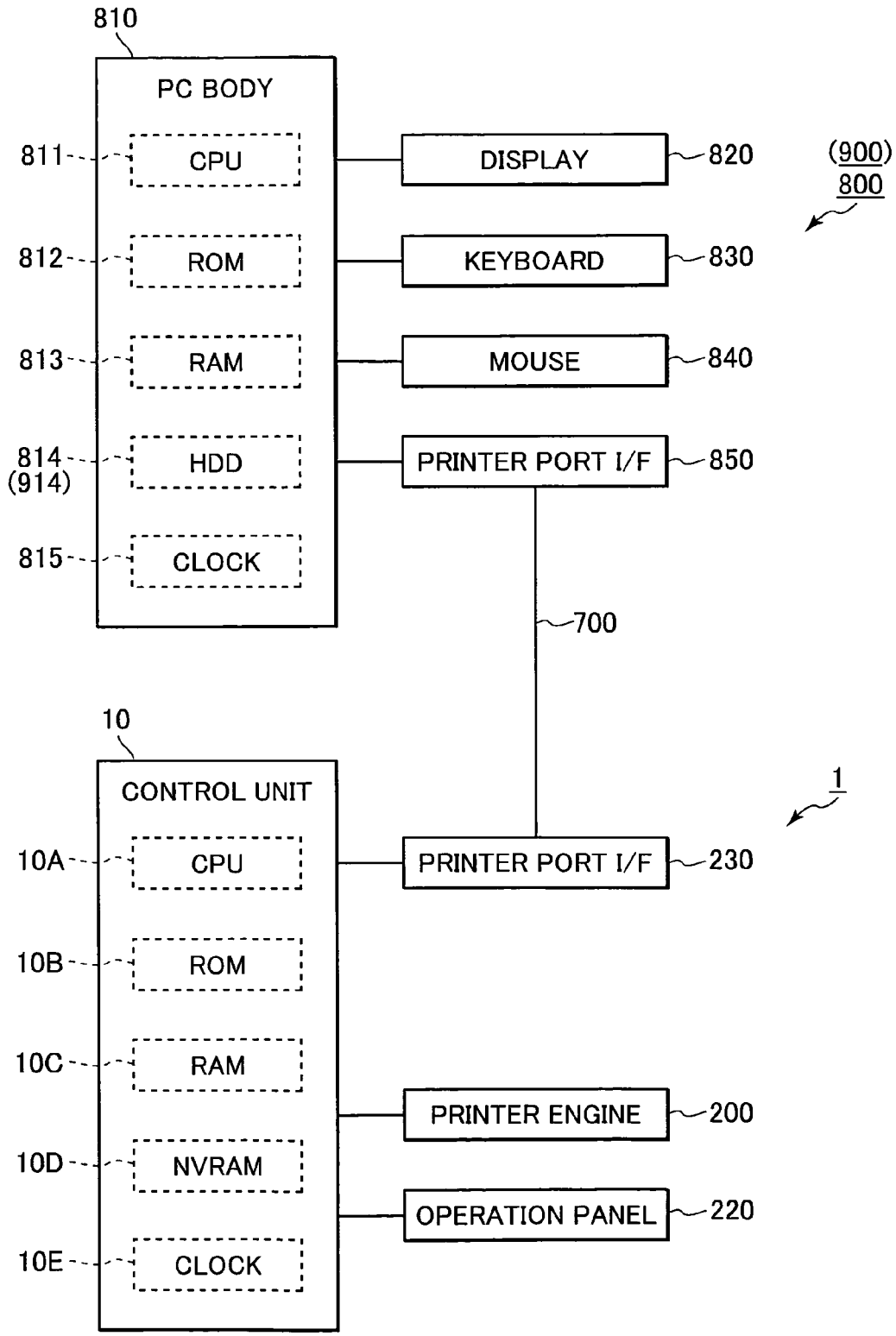
FIG. 2 is a block diagram showing the structures of control systems of the printer and personal computer in FIG. 1.

Next, FIG. 2 is a block diagram showing structures of control systems of the PC 800 and printer 1. As shown in FIG. 2, a main body 810 of the PC 800 includes a CPU 811, a ROM 812, a RAM 813, a hard disk device (HDD) 814, and a clock 815. The PC body 810 is connected to a display 820 such as a CRT, a key-board 830, a mouse 840 (which are shown in FIG. 1), and a printer port interface (printer port I/F) 850, which is for being connected with the printer 1.

A control unit 10 of the printer 1 is constructed as a microcomputer including a CPU 10A, a ROM 10B, and a RAM 10C. The control unit 10 is further provided with a clock 10E and a NVRAM 10D which is designed so as to maintain stored contents even after the power is switched off. The control unit 10 is connected to a printer engine 200 for forming images, an operation panel 220 provided on a surface of the printer 1 (see FIG. 1), and a printer port interface (printer port I/F) 230 which is for being connected with the PC 800.

The NVRAM 10D previously stores therein: a first three-dimensional look-up table (LUT) 303; a plurality of second three-dimensional look-up tables (LUTs) 301; one set of basic UCR/GCR one-dimensional tables 307; and one set of additional UCR/GCR one-dimensional tables 309. All of the first three-dimensional LUT 303, the plurality of second three-dimensional LUTs 301, the set of basic UCR/GCR one-dimensional tables 307, and the set of additional UCR/GCR one-dimensional tables 309 are generated by a manufacturer of the printer 1 and is stored in the NVRAM 10D, before being shipped from the manufacturer.

The first three-dimensional table 303 defines three-dimensional relationship between RGB data (R, G, B) and CMYK data (C, M, Y, K) as shown in FIG. 15(a). More specifically, the first three-dimensional table 303 stores one set of CMYK data (C, M, Y, K) for each of a plurality of RGB grid points (R, G, B) set in a three-dimensional RGB grid space.

Figure 13A:
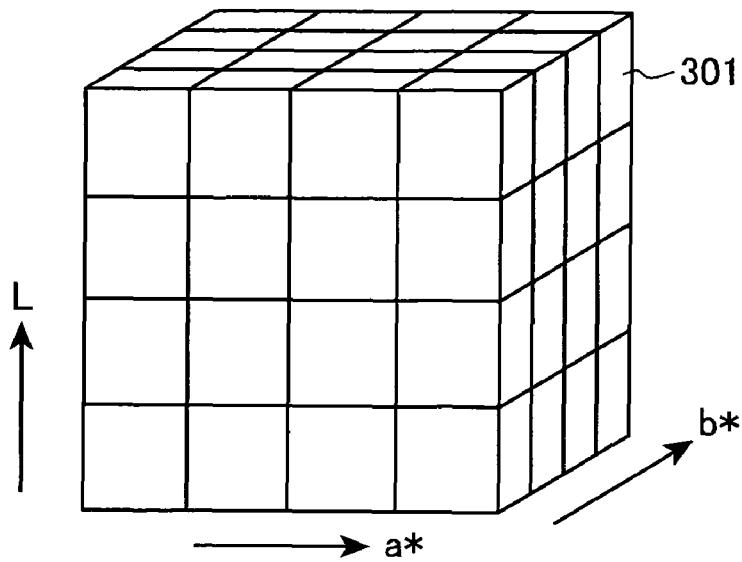
Figure 14A:
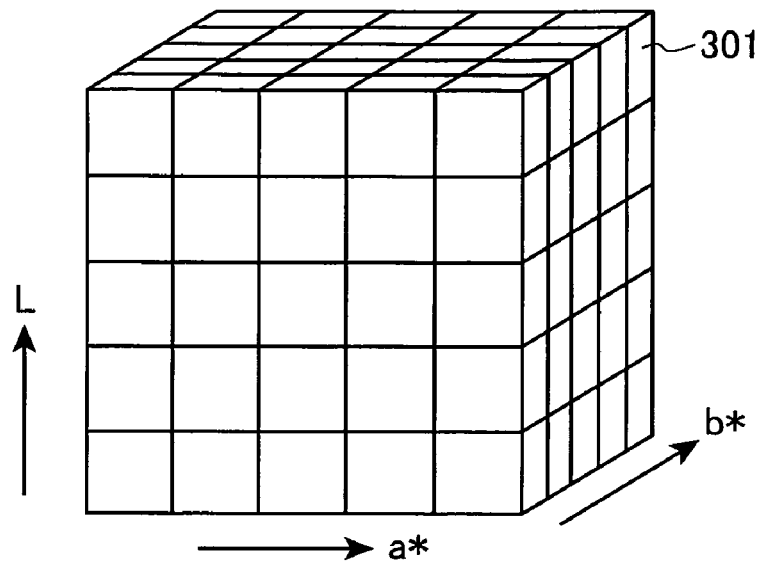

Each of the plurality of second three-dimensional tables 301 defines three-dimensional relationship between Lab data (L*, a*, b*) and RGB data (R, G, B). FIG. 13(a) shows the structure of the second three-dimensional table 301 if the second three-dimensional table 301 has an odd number of Lab grids. FIG. 14(a) shows the structure of the second three-dimensional table 301 if the second three-dimensional table 301 has an even number of Lab grids. Each second three-dimensional table 301 stores one set of RGB data (R, G, B) for each of a plurality of Lab grid points (L*, a*, b*) set in a three-dimensional Lab grid space.

The set of basic UCR/GCR one-dimensional tables 307 and the set of additional UCR/GCR one-dimensional tables 309 have the same configuration that is as shown in FIG. 4(d). More specifically, the set of basic UCR/GCR one-dimensional tables 307 includes a basic one-dimensional UCR/GCR table 307 for cyan, a basic UCR/GCR one-dimensional table 307 for magenta, a basic UCR/GCR one-dimensional table 307 for yellow, and a basic UCR/GCR one-dimensional table 307 for black. The basic UCR/GCR one-dimensional table 307 for cyan defines one-dimensional relationship between a value minK and the value of ΔC to be described later. The basic UCR/GCR one-dimensional table 307 for magenta defines one-dimensional relationship between the value minK and the value of ΔM. The basic UCR/GCR one-dimensional table 307 for yellow defines one-dimensional relationship between the value minK and the value of ΔY. The basic UCR/GCR one-dimensional table 307 for black defines one-dimensional relationship between the value minK and the value of ΔK.

The set of additional UCR/GCR one-dimensional tables 309 includes an additional UCR/GCR one-dimensional table 309 for cyan, an additional UCR/GCR one-dimensional table 309 for magenta, an additional UCR/GCR one-dimensional table 309 for yellow, and an additional UCR/GCR one-dimensional table 309 for black. The additional UCR/GCR one-dimensional table 309 for cyan defines one-dimensional relationship between a value minK and the value of ΔC to be described later. The additional UCR/GCR one-dimensional table 309 for magenta defines one-dimensional relationship between the value minK and the value of ΔM. The additional UCR/GCR one-dimensional table 309 for yellow defines one-dimensional relationship between the value minK and the value of ΔY. The additional UCR/GCR one-dimensional table 309 for black defines one-dimensional relationship between the value minK and the value of ΔK.

The plurality of second three-dimensional tables 301 are in one to one correspondence with a plurality of matching methods that can be employed for a color management process. The plurality of matching methods include: a default matching method; a method of emphasizing chroma; a method of maintaining relative gamut; a method of maintaining absolute gamut. The plurality of second three-dimensional tables 301 therefore include: a second three-dimensional table 301 for the default matching method; a second three-dimensional table 301 for the method of emphasizing chroma, a second three-dimensional table 301 for the method of maintaining relative gamut; and a second three-dimensional table 301 for the method of maintaining absolute gamut. The default matching method is for attaining perceptually the same color as color that is obtained when no color management is attained. When the default matching method is selected for the color management process, the one set of additional UCR/GCR tables 309 is used for RGB data that satisfies R=G=B and therefore that indicates gray, and the one set of basic UCR/GCR tables 307 is used for RGB data that indicates color other than gray. When a matching method other than the default matching method is selected for the color management process, the one set of basic UCR/GCR, tables 301 is used for any RGB data regardless of whether the RGB data indicates gray or not.

Figure 3:
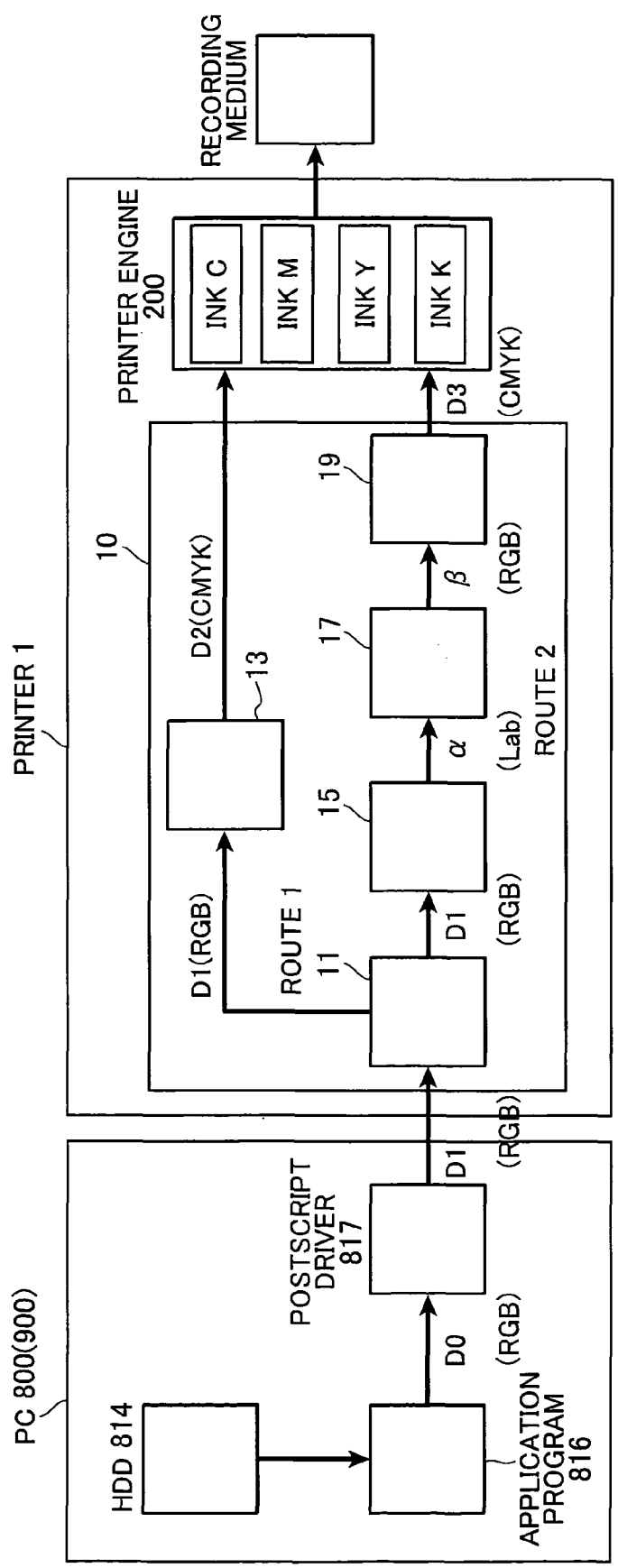
FIG. 3 is an explanatory chart showing a processing flow how the printer and the personal computer cooperate to form an image on a recording medium.

Next, FIG. 3 explains a flow of processing how the printer 1 and PC 800 cooperate to form an image on a recording medium.

Image data D0 indicative of one of 256 is gradations expressed in a RGB color space is prepared by an application program 816 stored in the HDD 914 of the PC 800.

A PostScript (registered trademark) driver 817 stored in the HDD 814 is a software, and is for rewriting the image data D0 into input image data D1 of a PostScript format (hereinafter PostScript data). The PostScript (registered trademark) driver 817 inputs the input image data D1 to the printer 1.

When rewriting the original image data D0 to the input image data D1, depending on the setting of the application program, the PostScript (registered trademark) driver 817 adds an identification command (hereinafter, color space identification command) to the input image data D1 (Postscript data). The color space identification command is either a command DeviceRGB for ordering color conversion to a color space unique to the device (printer engine 200) or a command CIEBasedABC for ordering color conversion independent of the device (printer engine 200).

When a user sets no color management on the application program, the PostScript (registered trademark) driver 817 adds a command DeviceRGB to the input image data D1 (PostScript data). The input image data D1 (PostScript data) added with the command DeviceRGB will be treated as device-dependent RGB data.

When the user sets color management on the application program, the PostScript (registered trademark) driver 817 adds a command CIEBasedABC to the input image data D1 (PostScript data). The input image data D1 (PostScript data) added with the command CIEBasedABC will be treated as RGB data expressed in a color space specified as a device-independent color space by the application program 816.

In the present embodiment, an sRGB (Standard RGB) color space is designated as a default device-independent color space in the application program 816. So, input image data D1 (PostScript data) added with the command CIE-BasedABC will be treated as sRGB data when the default device-independent color space is designated in the application program 816. Profile data including sRGB profile data is described in the input image data D1 (PostScript data).

A route selection unit 11 forming part of the control unit 10 of the printer 1 selects a conversion route from among routes 1 and 2, based on the color space identification command added to the input image data D1 input from the PC 800. That is, if the color space identification command added to the input image data D1 is the command DeviceRGB, the route selection unit 11 selects the route 1 as the conversion route. Otherwise, if the color space identification command is the command CIEBasedABC, the route selection unit 11 selects the route 2 as the conversion route.

If the route 1 is selected, a first color conversion unit 13 forming part of the control unit 10 converts the input image data D1 into first output image data D2 indicating one of 256 gradations expressed in a CMYK color space by using the first three-dimensional lookup table (LUT) 303. The CMYK color space is defined by C (cyan), M (magenta), Y (yellow), and K (black).

Otherwise, if the route 2 is selected, at first, a second-first color conversion unit 15 also forming part of the control unit 10 converts the input image data D1 into Lab intermediate image data α expressed in a L*a*b color space by using predetermined expressions (IEC 61966-2-1 defined by IEC: International Electrotechnical Commission) defined in the color space (sRGB color space, in this example) indicated by the command CIEbasedABC. This conversion is achieved for each pixel through steps of: subjecting the RGB data (sRGB data, in this example) constituting the input image data D1 to gamma calibration to obtain R'G'B' data by using a predetermined gamma value; converting the gamma-calibrated R'G'B' data into XYZ data expressed on a device-independent XYZ color coordinate system by using a 3×3 matrix table; and further converting the XYZ data into L*a*b data expressed on a device-independent Lab color space by using predetermined expressions.

More specifically, the conversion is expressed by the following expressions (1):

$$\begin{pmatrix} R' \\ G' \\ B' \end{pmatrix} = \begin{pmatrix} R^\gamma \\ G^\gamma \\ B^\gamma \end{pmatrix} \quad (1)$$

$$\begin{pmatrix} X \\ Y \\ Z \end{pmatrix} = \begin{pmatrix} x_r & x_g & x_b \\ y_r & y_g & y_b \\ z_r & z_g & z_b \end{pmatrix} \begin{pmatrix} R' \\ G' \\ B' \end{pmatrix}$$

$$f_x = \begin{cases} \sqrt[3]{\dfrac{X}{X_n}} & \dfrac{X}{X_n} > 0.008856 \\ \left(903.3 \times \dfrac{X}{X_n} + 16\right)/116 & \dfrac{X}{X_n} \le 0.008856 \end{cases}$$

$$f_y = \begin{cases} \sqrt[3]{\dfrac{Y}{Y_n}} & \dfrac{Y}{Y_n} > 0.008856 \\ \left(903.3 \times \dfrac{Y}{Y_n} + 16\right)/116 & \dfrac{Y}{Y_n} \le 0.008856 \end{cases}$$

$$f_z = \begin{cases} \sqrt[3]{\dfrac{Z}{Z_n}} & \dfrac{Z}{Z_n} > 0.008856 \\ \left(903.3 \times \dfrac{Z}{Z_n} + 16\right)/116 & \dfrac{Z}{Z_n} \le 0.008856 \end{cases}$$

$$L = 116 \times f_y - 16$$
$$a = 500 \times (f_x - f_y)$$
$$b = 200 \times (f_y - f_z)$$

It is noted that the values Xn, Yn, and Zn are values of an observation light source. Data of the values Xn, Yn, and Zn is contained in the profile data included in the input image data D1 (Postscript data). Data of the gamma values and the 3×3 matrix table is contained in the sRGB profile data included in the input image data D1 (Postscript data). It is noted, however, that data of the values Xn, Yn, and Zn, the gamma value, and the 3×3 matrix table may be stored in the NVRAM 10D.

The expressions (1) explained above indicate conversion characteristics S (shown in FIG. 10), in which the second-first color conversion unit 15 converts RGB data into Lab data.

A second-second color conversion unit 17 forming part of the control unit 10 converts the Lab intermediate image data α into RGB intermediate image data β by using the second three-dimensional lookup table (LUT) 301 that corresponds to the user's selected matching method.

Next, a second-third color conversion unit 19 forming part of the control unit 10 converts RGB intermediate image data β into second output image data D3 indicative of one of 256 gradations expressed in the CMYK color space by using the set of basic UCR/GCR one-dimensional tables 307 or the set of additional UCR/GCR one-dimensional tables 309.

More specifically, when the user selects the route 2 with the default matching method, the second-third color conversion unit 19 converts the RGB intermediate image data β into second output image data D3, by using either the set of basic UCR/GCR one-dimensional tables 307 and the set of additional UCR/GCR one-dimensional tables 309 depending on whether the RGB intermediate image data β indicates gray. That is, if RGB intermediate image data β satisfies R=G=B and therefore indicates gray, the second-third color conversion unit 19 uses the one set of additional UCR/GCR one-dimensional tables 309 to convert the RGB intermediate image data β into second output image data D3. If RGB intermediate image data β does not satisfy R=G=B and therefore indicates color other than gray, the second-third color conversion unit 19 uses the one set of basic UCR/GCR one-dimensional tables 307 to convert the RGB intermediate image data β into second output image data D3.

When the user selects the route 2 with a matching method other than the default matching method, the second-third color conversion unit 19 converts the RGB intermediate image data β into second output image data D3 by using the one set of basic UCR/GCR one-dimensional tables 307 regardless of whether the RGB intermediate image data β indicates gray or not.

Next will be described with reference to FIGS. 4(a)-4(e) how the second-third color conversion unit 19 converts RGB intermediate image data β into second output image data D3 by using a corresponding set of UCR/GCR one-dimensional tables (basic UCR/GCR one-dimensional tables 307 or additional UCR/GCR one-dimensional tables 305).

First, as shown in FIG. 4(a), for each pixel, values of C, M, and Y are first determined as complement numbers of values of R, G, and B in the RGB intermediate image data β.

Next as shown in FIG. 4(b), a value minK is set as a minimum value among the values of C, M, and Y for each pixel.

Next as shown in FIG. 4(c), values C', M', and Y' are obtained respectively as results of subtracting the value minK from the values of C, M, and Y.

Next as shown in FIG. 4(d), values of ΔC, ΔM, ΔY, and ΔK are obtained by using the corresponding UCR/GCR one-dimensional tables 307 or 309 which define relationships between the value minK and the values of ΔC, ΔM, ΔY, and ΔK, respectively.

Next as shown in FIG. 4(e), the values of C, M, and Y are obtained respectively as results of adding the values of ΔC, ΔM, and ΔY to the values of C', M', and Y'. The value of ΔK is set as the value of K.

Referring back to FIG. 3, the control unit 10 outputs the first output image data D2 or second output image data D3 to the printer engine 200. The printer engine 200 forms an image on a recording medium, based on the first output image data D2 or second output image data D3. That is, when the printer engine 200 receives the first output image data D2, the printer engine 200 forms an image on a recording medium, based on the first output image data D2. When the printer engine 200 receives the second output image data D3, the printer engine 200 forms an image on a recording medium, based on the second output image data D3.

FIGS. 5 to 7 show an operation screen displayed on the display 820 of the PC 800 when the user inputs his/her desire to input the input image data D1 generated by the PC 800 to the printer 1. On the operation screen, a user can set either "no color management" shown in FIG. 6 or "color processing by printer" shown in FIG. 7 in the column of "color processing (N)" shown in FIG. 5. If the user selects "no color management" in the column "color processing (N)", the PostScript driver 817 adds the command DeviceRGB as the color space identification command. At this time, the control unit 10 of the printer 1 selects the route 1 as a route for conversion of the input image data D1 (see FIG. 3).

Otherwise, if the user selects "color processing by printer" in the column "color processing (N)" to indicate his/her selection of color management, the PostScript driver 817 adds the command CIEBasedABC as the color space identification command. At this time, the control unit 10 of the printer 1 selects the route 2 as a route for conversion of the input image data D1 (see FIG. 3).

More specifically, if the user selects color management by selecting "color processing by printer" in the column "color processing (N)", the user can further select his/her desired matching method from among the plurality of matching methods. The user can select his/her desired matching method by operating a scroll bar for the matching method. The default matching method is for attaining perceptually the same color with the route 1. So, if the user unintentionally selects the "color processing by printer" in the column "color processing (N)", but does not operate the scroll bar for the matching method, the indication "perpetual" remains indicated in the scroll bar for the matching method on the screen as shown in FIG. 7, and the default matching method for attaining perceptually the same color with the route 1 is selected as the matching method.

When the default matching method is selected, the second-second color conversion unit 17 uses the second three-dimensional LUT 301 for the default matching method, and the second-third color conversion unit 19 uses the one set of basic UCR/GCR tables 307 and the one set of additional UCR/GCR tables 309.

It is noted that in order to ensure that color to be obtained through the default matching method in the color management process (route 2) is perceptually the same as color to be obtained through the no-color management process (route 1), the second three-dimensional LUT 301 for the default matching method and the set of additional UCR/GCR one-dimensional tables 309 (color conversion condition of the printer 1 for the default matching method) are determined after the first three-dimensional LUT 303 and the set of basic UCR/GCR one-dimensional tables 307 are prepared. The second three-dimensional LUT 301 for the default matching method is determined based on the first three-dimensional LUT 303 and the set of basic UCR/GCR one-dimensional tables 307. The set of additional UCR/GCR one-dimensional tables 309 are determined based on the first three-dimensional LUT 303.

Figure 8:
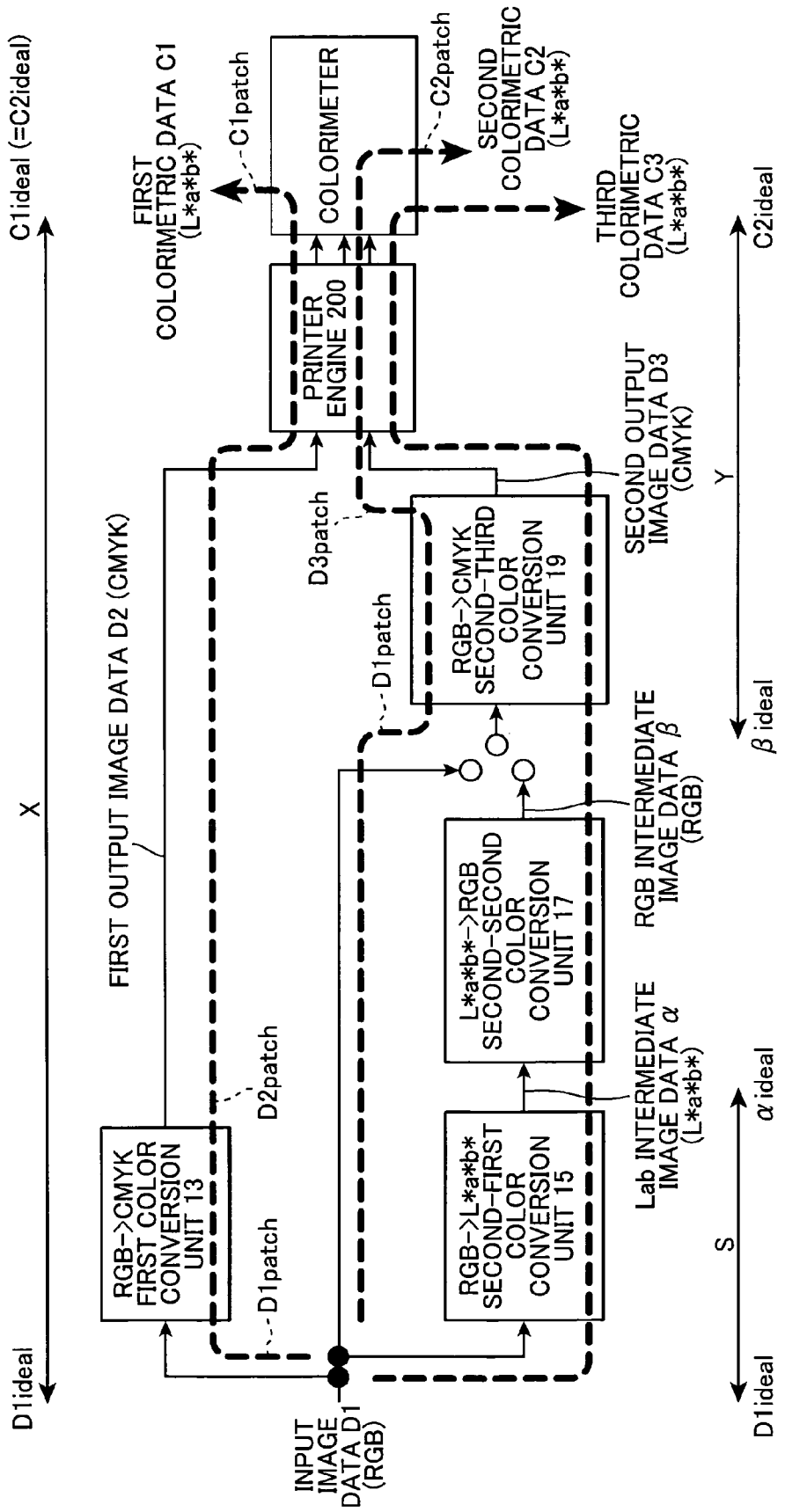
FIG. 8 is an explanatory chart showing a method for setting a color conversion condition in the printer.

Next will be described a method for determining the second three-dimensional LUT 301 for the default matching method and the one set of additional UCR/GCR one-dimensional tables 309. The second three-dimensional LUT 301 for the default matching method and the set of additional UCR/GCR one-dimensional tables 309 are determined by the manufacturer by connecting the manufacturer's PC 900 to the printer 1 in the same manner as shown in FIGS. 1-3. The PC 900 has the same configuration as the PC 800. The PC 900 can control all of the route selection unit 11, the first color conversion unit 13, the second-first color conversion unit 15, the second-second color conversion unit 17, and the second-third color conversion unit 19 in the printer 1 by executing programs of FIGS. 9 and 12 (to be described later) that are stored in a HDD 914 included in the PC 900. The PC 900 can even control the route selection unit 11 to input image data directly to the second-third color conversion unit 19 as shown in FIG. 8.

First, the second three-dimensional LUT 301 for the default matching method is set. After setting the second three-dimensional LUT 301 for the default matching method, the one set of additional UCR/GCR one-dimensional tables 309 is set.

First will be described, with reference to FIGS. 8-11(d), the method for setting the second three-dimensional LUT 301 for the default matching method.

Figure 9:
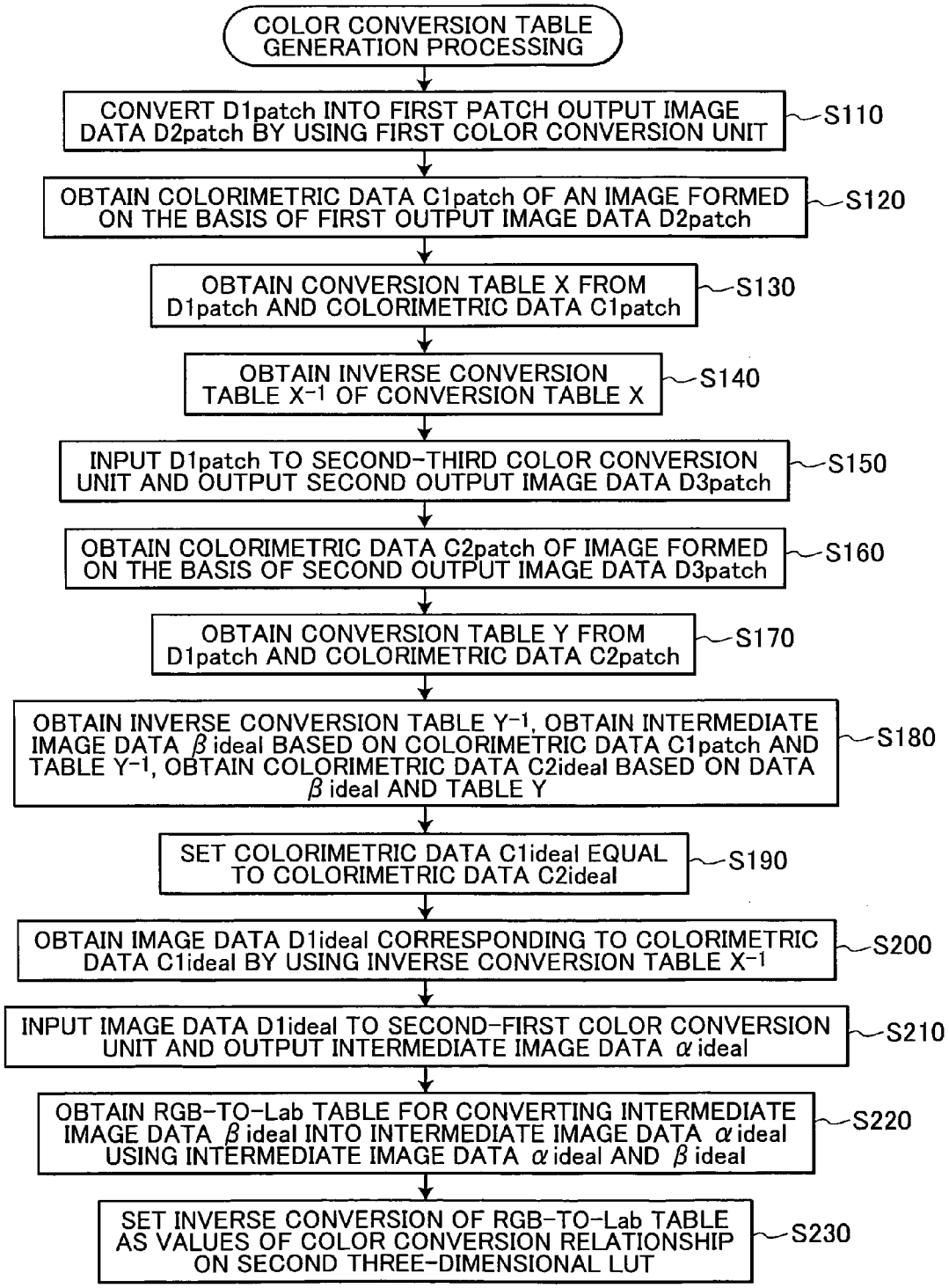
FIG. 9 is a flowchart showing the method for setting the color conversion condition in the printer.

In S110 in FIG. 9, patch input image data D1patch indicative of a gradation patch is input as input image data D1 to the first color conversion unit 13 on the route 1. The patch input image data D1patch includes 729 sets of RGB data obtained by combining nine gradations of R, G, and B that are arranged by equal intervals along the R–, G–, and B– axes. That is, the patch input image data D1patch includes 729 different sets of RGB data, wherein each of R, G, and B values being equal to either one of 0, 32, 64, 96, 128, 160, 192, 224, and 255.

The patch input image data D1patch is converted by the first color conversion unit 13 into first patch output image data D2patch as shown in FIG. 8. The first patch output image data D2patch includes 729 sets of CMYK data that are obtained by converting the 729 sets of RGB data in the patch input image data D1patch by the first color conversion unit 13. The first patch output image data D2patch outputs from the first color conversion unit 13 as first output image data D2.

In S120, the first patch output image data D2patch obtained in S110 is input to the printer engine 200. As a result, an image is formed on a medium by the printer engine 200 based on the first patch output image data D2patch. Colors of the image are measured by a colorimeter, and data obtained by the measurement are taken as first patch colorimetric data C1patch as shown in FIG. 8. The first patch calorimetric data C1patch includes 729 sets of Lab colorimetric data. Thus, the first patch colorimetric data C1patch is generated as first colorimetric data C1 of an image that is formed by the printer engine 200 based on the first output image data D2.

Figure 10:
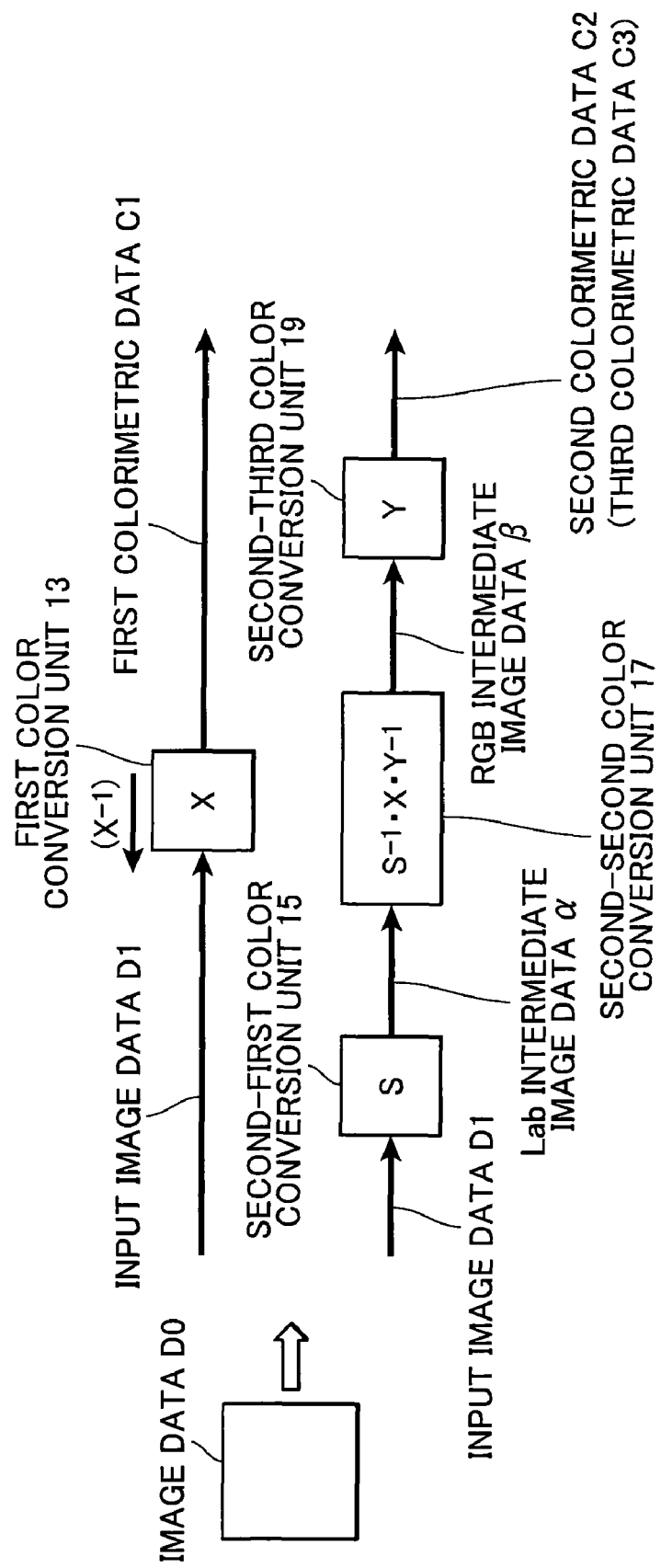
FIG. 10 is an explanatory chart showing how data is generated during the process of setting the color conversion condition.

In S130, a color conversion table X, indicative of one-to-one correspondence between the 729 sets of RGB data in the patch input image data D1patch and the 729 sets of Lab data in the first patch colorimetric data C1patch, is obtained based on the 729 sets of RGB data in the patch input image data D1patch that are inputted in S110 and the 729 sets of Lab data in the first patch calorimetric data C1patch that are obtained in S120. The thus obtained color conversion table X represents conversion characteristics, in which the first color conversion unit 13 and the printer engine 200 serve to convert RGB data (input image data D1) into Lab data (first calorimetric data C1) as shown in FIGS. 8 and 10.

In step 140, an inverse conversion table $X^{-1}$ for the color conversion table X is obtained.

A method for obtaining the inverse conversion table $X^{-1}$ will now be described with reference to FIGS. 11(a) to 11(d).

Figure 11A:
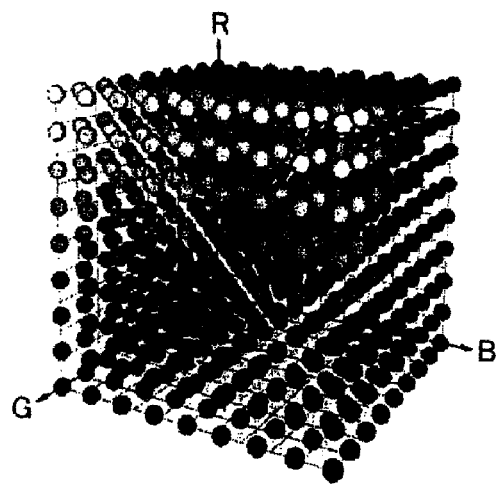

FIG. 11(a) shows the color conversion table X (or referred to as a RGB-to-L*a*b table) obtained in S130. This color conversion table X is defined on the RGB color space. 729 RGB grids defined by 729 sets of RGB data contained in the patch input image data D1patch are plotted in the RGB color space for the color conversion table X as denoted by balls in FIG. 11(a). One set of Lab data in the first patch colorimetric data C1patch that is defined in the L*a*b color space and that is obtained for each set of RGB data in the patch input image data D1patch is set on the corresponding RGB grid.

Figure 11B:
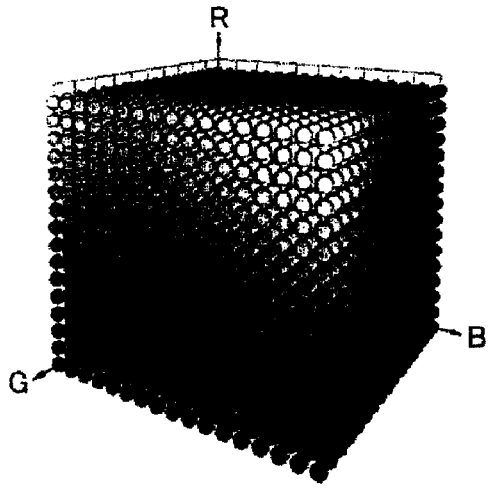

Next, as shown in FIG. 11(b), the number of RGB grids on the color conversion table X is increased by interpolation (linear interpolation) to narrow the RGB grid interval.

Figure 11C:
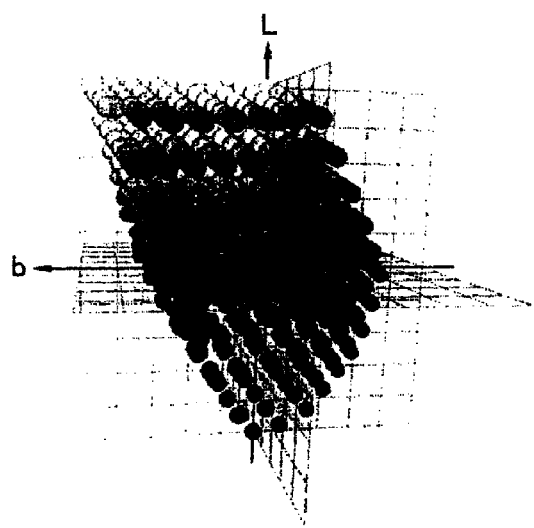

Next, as shown in FIG. 11(c), Lab values on the RGB grids in the color conversion table X are remapped into the L*a*b color space.

Figure 11D:
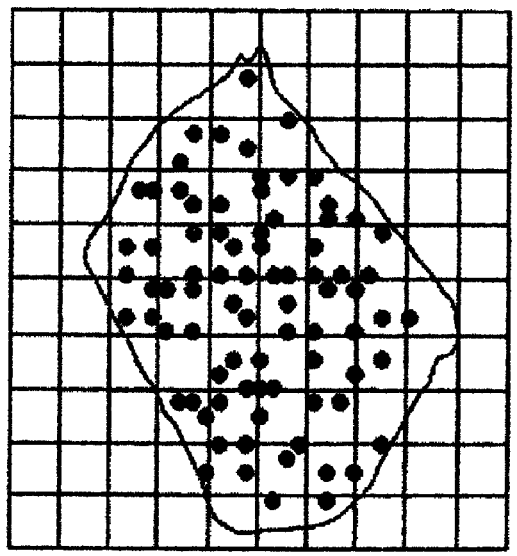

Finally, as shown in FIG. 11(d), the inverse conversion table $X^{-1}$ indicative of conversion from the L*a*b* color space into the RGB color space is generated by setting, as RGB values on each Lab grid in the L*a*b color space, RGB values at an Lab point that is closest to the subject Lab grid. The inverse conversion table $X^{-1}$ therefore indicates one-to-one correspondence between Lab grids and RGB values.

Referring back to FIG. 9, the patch input image data D1patch the same as that input in the first color conversion unit 13 in S110 is input as RGB intermediate image data β to the second-third color conversion unit 19 in S150. As a result, the second-third color conversion unit 19 performs the conversion of FIGS. 4(a)-4(e) by using the set of basic UCR/GCR one-dimensional tables 307, thereby generating second patch output data D3patch as second output image data D3 as shown in FIG. 8. The second patch output image data D3patch includes 729 sets of CMYK data that are obtained by converting the 729 sets of RGB data in the patch input image data D1patch by the second-third color conversion unit 19

In S160, the second patch output image data D3patch obtained in S150 is input to the printer engine 200. As a result, an image is formed by the printer engine 200 based on the second patch output image data D3patch. Colors of the image are measured by the colorimeter, and data obtained by the measurement is taken as second patch colorimetric data C2patch as shown in FIG. 8. The second patch colorimetric data C2patch includes 729 sets of Lab colorimetric data. Thus, the second patch colorimetric data C2patch is generated as second colorimetric data C2 of an image that is formed by the printer engine 200 based on the second patch output image data D3patch that is obtained by converting the patch input image data D1patch (RGB intermediate image data β) by the second-third color conversion unit 19.

In S170, a color conversion table Y, which indicates a one-to-one relationship between the 729 sets of RGB data contained in the patch input image data D1patch and the 729 sets of Lab data contained in the second patch colorimetric data C2patch, is obtained based on the patch input image data D1patch and the second patch colorimetric data C2patch obtained in S160. The thus obtained color conversion table Y represents the conversion characteristics, in which the second-third color conversion unit 19 and the printer engine 200 serve to convert RGB data (RGB intermediate image data β (=input image data D1)) into Lab data (second colorimetric data C2) as shown in FIGS. 8 and 10.

In S180, an inverse conversion table $Y^{-1}$ for the color conversion table Y is obtained in the same manner as in S140.

Further in S180, the first patch colorimetric data C1*patch* obtained in S120 is converted into ideal RGB intermediate image data β ideal by using the inverse conversion table $Y^{-1}$. Thus, the ideal RGB intermediate image data β ideal is generated as the RGB intermediate image data β. The ideal RGB intermediate image data β ideal includes 729 sets of RGB data that are obtained by converting the 729 sets of Lab data contained in the first patch colorimetric data C1*patch* by using the inverse conversion table $Y^{-1}$. The 729 sets of RGB data contained in the ideal RGB intermediate image data β ideal are indicative of 729 colors and have nine gradations of R, G, and B that are arranged along the R−, G−, and B− axes. It is ensured that an image that is formed by the printer engine 200 based on CMYK data that is obtained by converting the ideal RGB intermediate image data β ideal by the second-third conversion unit 19 will have the same Lab colorimetric data as the first patch colorimetric data C1*patch*.

Further in S180, the ideal RGB intermediate image data β ideal is converted into second ideal colorimetric data C2*ideal* by using the color conversion table Y that is obtained in S170. Thus, the second ideal colorimetric data C2*ideal* is generated as second colorimetric data C2. The second ideal calorimetric data C2*ideal* has 729 sets of Lab colorimetric data that are obtained by converting the 729 sets of RGB data contained in the ideal RGB intermediate image data β ideal by the color conversion table Y. The thus generated second ideal colorimetric data C2*ideal* therefore represents Lab calorimetric data (second colorimetric data C2) of an image that will be formed by the printer engine 200 based on CMYK data (second output image data D3) that is obtained by converting the ideal RGB intermediate image data β ideal (RGB intermediate image data β) by the second-third color conversion unit 19.

In S190, first ideal colorimetric data C1*ideal* is set as being equal to the second ideal calorimetric data C2*ideal* that is obtained in S180. Thus, the first ideal colorimetric data C1*ideal* is set as first colorimetric data C1. The first ideal colorimetric data C1*ideal* includes 729 sets of Lab colorimetric data that are the same as the 729 sets of Lab colorimetric data contained in the second ideal colorimetric data C2*ideal*.

In S200, the first ideal colorimetric data C1*ideal* (first colorimetric data C1) is converted by the inverse con-version table $X^{-1}$ determined in S140, thereby obtaining ideal input image data D1*ideal*. Thus, the ideal input image data D1*ideal* is obtained as input image data D1. The ideal input image data D1*ideal* includes 729 sets of RGB data that are obtained by converting the 729 sets of Lab data contained in the first ideal colorimetric data C1*ideal* by the inverse conversion table $X^{-1}$.

In step 210, the ideal input image data D1*ideal* obtained in S200 is input as input image data D1 to the second-first color conversion unit 15, and is converted by the second-first color conversion unit 15 into ideal Lab intermediate image data α ideal. Thus, the ideal Lab intermediate image data α ideal is generated as Lab intermediate image data α. The ideal Lab intermediate image data α ideal includes 729 sets of Lab data that are calculated by the expressions (1) based on the 729 sets of RGB data contained in the ideal input image data D1*ideal*.

In step 220, an RGB-to-L*a*b* table is obtained based on the ideal RGB intermediate image data β ideal (RGB intermediate image data β) that is obtained in S180 and the ideal Lab intermediate image data α ideal (Lab intermediate image data α) that is obtained in S210. The RGB-to-L*a*b* table is indicative of a one-to-one correspondence between the 729 sets of RGB data contained in the ideal RGB intermediate image data β ideal and the 729 sets of Lab data contained in the ideal Lab intermediate image data α ideal. In other words, the RGB-to-L*a*b* table is for converting the ideal RGB intermediate image data β ideal (RGB intermediate image data β) into the ideal Lab intermediate image data α ideal (Lab intermediate image data α).

In S230, an inverse conversion table (L*a*b*-to-RGB table) for the RGB-to-L*a*b* table obtained in S220 is obtained in the same manner as in S140. The inverse conversion table (L*a*b*-to-RGB table) is for converting the ideal Lab intermediate image data α ideal (Lab intermediate image data α) into the ideal RGB intermediate image data β ideal (RGB intermediate image data β). The values of the obtained inverse conversion table (L*a*b*-to-RGB table) are set in the second three-dimensional LUT 303 for the default matching method to be used by the second-second color conversion unit 17.

More specifically, similarly to the conversion table X shown in FIG. 11(*a*), the RGB-to-L*a*b* table that is determined in S220 is defined on the RGB color space. 729 RGB grids indicated by the 729 sets of RGB values in the ideal RGB intermediate image data β ideal are plotted in the RGB color space for the RGB-to-L*a*b* table as denoted by balls in FIG. 11(*a*). One set of Lab values contained in the ideal Lab intermediate image data α ideal that is defined in the L*a*b color space and that is obtained for each RGB data set contained in the ideal RGB intermediate image data β ideal is set on the corresponding RGB grid.

Next, as shown in FIG. 11(*b*), the number of RGB grids on the RGB-to-L*a*b* table is increased by interpolation (linear interpolation) to narrow the grid interval.

Next, as shown in FIG. 11(*c*), Lab values on the RGB grids in the RGB-to-L*a*b* table are remapped into the L*a*b color space.

Finally, as shown in FIG. 11(*d*), the inverse conversion table (L*a*b*-to-RGB table) indicative of conversion from the L*a*b* color space into the RGB color space is generated by setting, as RGB values on each Lab grid in the L*a*b color space, RGB values at an Lab point that is closest to the subject Lab grid. The thus obtained inverse conversion table (L*a*b*-to-RGB table) therefore indicates one-to-one correspondence between Lab grids and KGB values. The thus obtained inverse conversion table (L*a*b*-to-RGB table) is set as the second three-dimensional LUT 301.

The thus obtained second third-dimensional LUT 301 for the default matching method indicates a relationship between the ideal Lab intermediate image data α ideal, which will be inputted into the second-second color conversion unit 17 when the ideal input image data D1*ideal* is inputted to the second-first color conversion unit 15, and the ideal RGB intermediate image data β ideal, which should be outputted from the second-second color conversion unit 17 in order to let an image, to be formed based on CMYK data that is obtained by converting the ideal RGB intermediate image data β ideal by the second-third color conversion unit 19, have second ideal colorimetric data C2*ideal* that is the same as the first ideal colorimetric data C1*ideal* of an image formed based on CMYK data that is obtained by converting the same ideal input image data D1*ideal* through the first color conversion unit 13.

Accordingly, the second third-dimensional LUT 301 for the default matching method ensures that an image to be formed based on second output data D3 that is obtained by converting the input image data D1 by the second-first color conversion unit 15, the second-second color conversion unit 17, and the second-third color conversion unit 19 successively on the route 2 to have colorimetric data (third colorimetric data C3) the same as colorimetric data (first colorimetric data C1) of an image formed based on first output image data D2 that is obtained by converting the same input image data D1 through the first color con-version unit 13 on the route 1.

To summarize, the method for setting the second three-dimensional LUT 301 for the default matching method proceeds as shown in FIG. 10.

The color conversion table X, indicative of conversion from input image data D1 to first colorimetric data C1, and the color conversion table Y, indicative of conversion from RGB intermediate image data β (=input image data D1) to second colorimetric data C2, are obtained at first (S110 to S170 in FIG. 9).

RGB intermediate image data β (ideal RGB intermediate image data β ideal) is determined based on the inverse conversion table $Y^{-1}$ so that an image formed based on CMYK data obtained by converting the RGB intermediate image data β (ideal RGB intermediate image data β ideal) by the second-third color conversion unit 19 has second colorimetric data C2 (second patch colorimetric data C2patch) that is the same as the first colorimetric data C1 (first patch colorimetric data C1patch) of an image that is formed based on CMYK data obtained by converting the input image data D1 (patch input image data D1patch) by the first color conversion unit 13.

Based on the assumption that the second colorimetric data C2 (second ideal colorimetric data C2ideal) is equal to the first calorimetric data C1 (first ideal colorimetric data C1ideal), conversions are executed starting from the RGB intermediate image data β (ideal RGB intermediate image data β ideal), to obtain the second colorimetric data C2 (second ideal colorimetric data C2ideal), the first colorimetric data C1 (=C2) (first ideal colorimetric data C1ideal (=C2ideal)), the input image data DL (ideal input image data D1ideal), and then the Lab intermediate image data α (ideal Lab intermediate image data α ideal) (S180 to S210 in FIG. 9). Based on the obtained Lab intermediate image data α (Lab intermediate image data α ideal) and RGB intermediate image data β (ideal RGB intermediate image data β ideal), the second three-dimensional LUT 301 for the default matching method for converting Lab intermediate image data α into RGB intermediate image data β is set (S220 to 230 in FIG. 9).

The above-described method for setting the second three-dimensional LUT 301 is executed by the PC 900 which operates based on the program shown in FIG. 9. For example, the program of FIG. 9 may be originally stored in a computer readable medium, such as: a CD-ROM, and is downloaded to the HDD 914 of the manufacturer's PC 900, and is executed by the PC 900.

After setting the second three-dimensional LUT 301 for the default matching method, the second three-dimensional LUT 301 for the default matching method is corrected at a gray axis. Additionally, the one set of additional UCR/GCR one-dimensional tables are generated based on the first three-dimensional LUT 303.

Next will be described, with reference to a flowchart shown in FIG. 12 and explanatory diagrams shown in FIGS. 13(a) to 15(b), the process for correcting the second three-dimensional LUT 301 for the default matching method at the gray axis and the process for generating the one set of additional UCR/GCR one-dimensional tables 309.

In S310 in FIG. 312, it is first determined whether the total number of Lab grids in the L*a*b* color space in the second three-dimensional LUT 301 is odd or not. If the total number of the Lab grids in the L*a*b* color space of the second three-dimensional LUT 301 is odd (yes in S310), the processing goes to S320. If the total number of the Lab grids in the L*a*b* color space of the second three-dimensional LUT 301 is even (no in S310), the processing goes to S330.

Figure 13B:
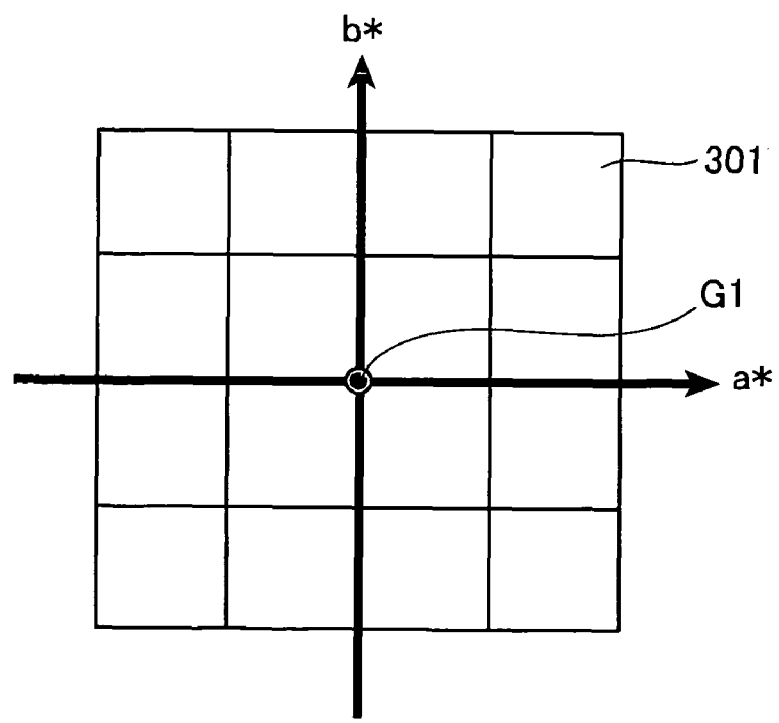

In S320, it is known that a grid G1 satisfying a*=b*=0 exists on the second three-dimensional LUT 301 because the number of the Lab grids in the L*a*b* color space is odd in the second three-dimensional LUT 301 as shown in FIGS. 13(a) and 13(b). So, RGB values at each grid G1 that satisfies a*=b*=0 are set to satisfy R=G=B.

Various methods are available for setting the RGB values at each Lab grid G1. For example, RGB values at each grid G1 are set to satisfy R=G=B=W, wherein W may be equal to: an average, a median, a maximum, or a minimum of the original R, G, and B values of the subject grid G1.

Figure 14B:
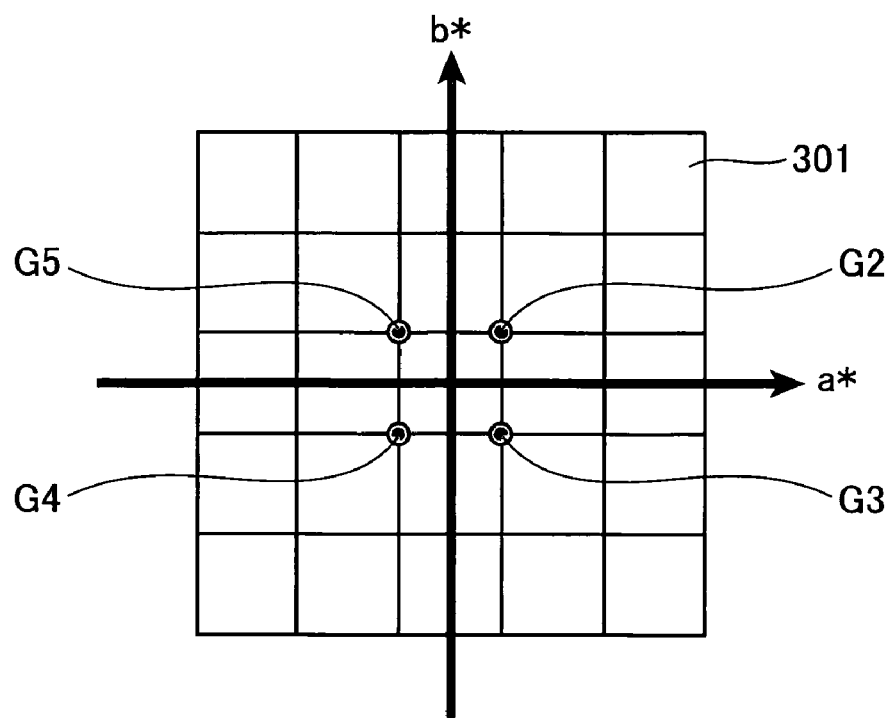

In S330, it is known that there exists no Lab grid satisfying a*=b*=0 on the second three-dimensional LUT 301 because the number of the Lab grids in the L*a*b* color space is even in the second three-dimensional LUT as shown in FIGS. 14(a) and 14(b). So, RGB values at each of the four grids G2 through G5 that surround each Lab point satisfying a*=b*=0 are all set to satisfy R=G=B. Also in this case, various methods are available for setting the RGB values at each grid G2, G2, G4, G5. For example, RGB values at each grid G2, G2, G4, G5 are set to satisfy R=G=B=W, wherein W may be equal to: an average, a median, a maximum, or a minimum of the original values of R, G, and B of the subject grid G2, G2, G4, G5.

Alternatively, when setting RGB values to satisfy R=G=B at each Lab grid G1 in S320 and at each Lab grid G2, G3, G4, or G5 in S330, the RGB values at each Lab grid G1, G2, G3, G4, or G5 can be set equal to those RGB values that are obtained by subjecting the Lab values at the subject Lab grid G1, G2, G3, G4, or G5 to an inverse conversion $S^{-1}$ of the conversion method S (FIG. 10) that is employed by the second-first color conversion unit 15. This ensures that when RGB input image data indicative of gray is inputted to the second-first color conversion unit 15 and is converted successively by the second-first color conversion unit 15 and the second-second color conversion unit 17, RGB values of RGB intermediate image data β that is outputted from the second-second color conversion unit 17 will be the same as the RGB values in the RGB input image data that is originally inputted to the second-first color conversion unit 15.

Thus, through S320 or S330, the second third-dimensional LUT 301 for the default matching method is corrected at the gray axis.

Next, in S340, values of C, M, Y, and K are extracted from the first three-dimensional LUT 303 at the RGB grids satisfying R=G=B. That is, CMYK values in the first three-dimensional LUT 303 at those RGB grids that are located on the gray axis 305 satisfying R=G=B are extracted as shown in FIGS. 15(a) and 15(b).

In S350, as shown in FIGS. 15(b) and 15(c), the values of C extracted in S340 are arranged and connected together to newly set an additional UCR/GCR one-dimensional table 309 for cyan, the values of M extracted in S340 are arranged and connected together to newly set an additional UCR/GCR one-dimensional table 309 for magenta, the values of Y extracted in S340 are arranged and connected together to newly set an additional UCR/GCR one-dimensional table 309 for yellow, and the values of K extracted in S340 are arranged and connected together to newly set an additional UCR/GCR one-dimensional table 309 for black.

Thus, the one set of additional UCR/GCR one-dimensional tables 309 are generated. Then, the gray axis correction of FIG. 12 is completed.

Figure 12:
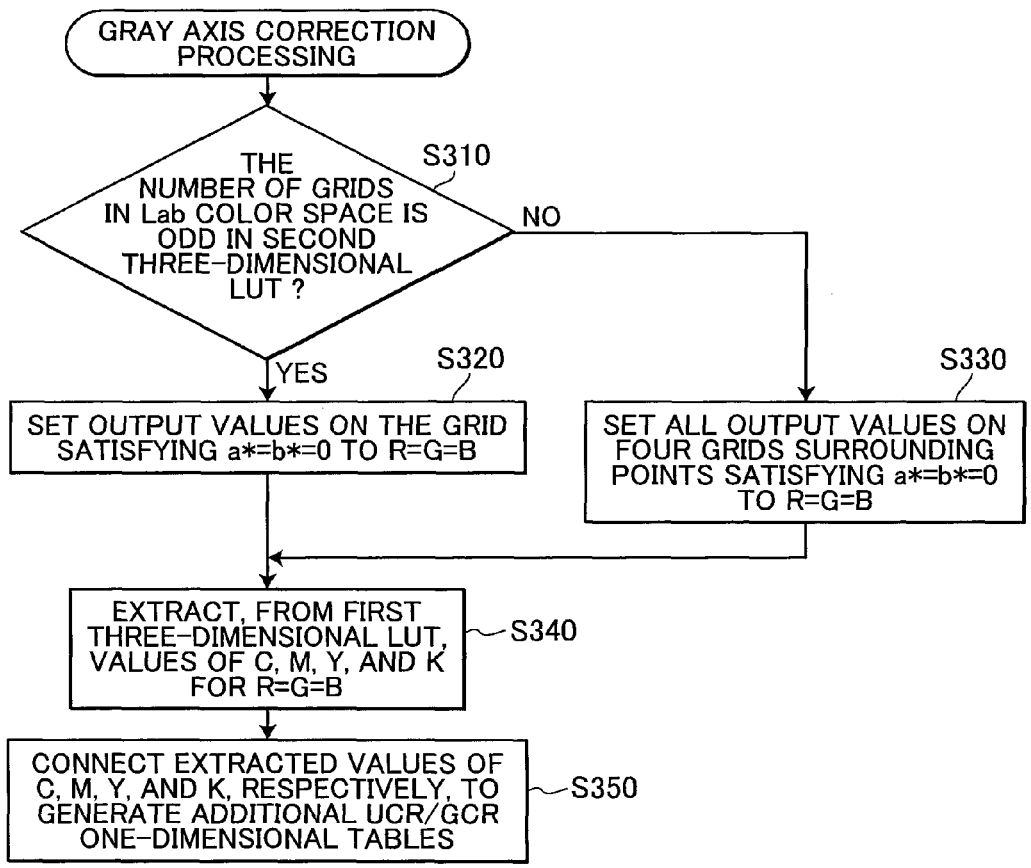
FIG. 12 is a flowchart showing a gray axis correction processing.

After completing the gray axis correction of FIG. 12, the second three-dimensional LUT 301 for the default matching method and the additional UCR/GCR one-dimensional tables 309 are stored in the NVRAM 10D. The additional UCR/GCR one-dimensional tables 309 are stored in the NVRAM 10D together with the set of basic UCR/GCR one-dimensional tables 307 that have been used in S150.

When the user selects color management (route 2) and the default matching method, the set of additional UCR/GCR one-dimensional tables 309 will be used in the second-third color conversion unit 19 for RGB intermediate image data β that satisfies R=G=B, and the set of basic UCR/GCR one-dimensional tables 307 will be used in the second-third color conversion unit 19 for RGB intermediate image data β that does not satisfy R=G=B. The set of basic UCR/GCR one-dimensional tables 307 will be used in the second-third color conversion unit 19 also when the user selects color management (route 2) while selecting a matching method other than the default state.

The above-described method for correcting the gray axis is executed by a computer which operates based on the program of FIG. 12. For example, the program of FIG. 12 may be originally stored in a computer readable medium, such as a CD-ROM, and is downloaded to the HDD 914 of the manufacturer's PC 900, and is executed by the PC 900.

It is noted that Lab values at RGB points satisfying R=G=B can be set to satisfy a*=b*=0 when performing in S230 an interpolation calculation to increase the number of RGB grids on the RGB-to-L*a*b* table to narrow the grid interval. In this case, S310, S320, and 3330 can be omitted from the process of FIG. 12.

As described above, as shown in FIG. 10, the first color conversion unit 13 and the printer engine 200 serve to convert input image data D1 into first colorimetric data C1 in color conversion characteristics defined by the color conversion table X. The second-third color conversion unit 19 and the printer engine 200 serve to convert RGB intermediate image data β into second colorimetric data C2 in color conversion characteristics defined by the color conversion table Y. So, according to the method for setting the color conversion condition of the embodiment, the color conversion table X and the color conversion table Y are first obtained.

The second-first color conversion unit 15 serves to convert input image data D1 into Lab intermediate image data α in color conversion characteristics S that are defined by the expressions (1).

The first colorimetric data C1 and second colorimetric data C2 are supposed to be equal to each other. So, suppose a loop in FIG. 10, which loops from RGB intermediate image data β as a start point to second colorimetric data C2, first colorimetric data C1 (=C2), input image data D1, Lab intermediate image data α, and back to RGB intermediate image data β. The color conversion relationship Y between the RGB intermediate image data β and the second colorimetric data C2, the relationship between the second colorimetric data C2 and the first colorimetric data C1 the color conversion relationship $X^{-1}$ between the first colorimetric data C1 and the input image data D1, and the color conversion relationship S between the input image data D1 and the intermediate image data α are all defined. So, Lab intermediate image data α is uniquely determined in correspondence with the RGB intermediate image data β. The color conversion relationship in the second-second color conversion unit 17 for the default matching method, that is, the second three-dimensional LUT 301 for the default matching method is indicative of a color conversion relationship between the RGB intermediate image data β and the Lab intermediate image data α. The color con-version relationship in the second-second color conversion unit 17 for the default matching method is therefore defined by $S^{-1} \cdot X \cdot Y^{-1}$.

Thus, the color conversion relationship in the second-second color conversion unit 17 for the default matching method is set based on the assumption that the first colorimetric data C1 is equal to second colorimetric data C2 of an image formed on the basis of the second output image data D3. Accordingly, it is ensured that the first colorimetric data C1 of an image formed on the basis of the first output mage data D2 obtained by converting the input image data D1 by the first color conversion unit 13 is equal to calorimetric data (third colorimetric data C3 shown in FIG. 8) of an image formed on the basis of the second output image data D3 that is obtained by conversions on the same input image data D1 sequentially using the second-first color conversion unit 15, second-second color conversion unit 17, and second-third color conversion unit 19.

That is, in the printer 1 in which the color conversion condition is set by the method for setting the color conversion condition according to the embodiment, values of colors measured by the colorimeter are equal between images which are respectively obtained in two different cases. In one of the cases, input image data D1 is converted into first output image data D2 through the route 1, and an image is formed on the basis of the first output image data D2. In the other of the cases, the same input image data D1 is converted into second output imago data D3 by the route 2, and an image is formed on the basis of the second output image data D3.

Therefore, output images look the same colors as each other regardless of whether the route 1 or 2 is selected. Images having the same colors as users have expected can always be obtained easily.

The printer 1 uses the same printer engine 200 having the same characteristics for both of the route 1 and the route 2. When input image data D1 is input to the route 1, the input image data D1 is converted into first calorimetric data C1 in conversion characteristics X, and the first colorimetric data C1 is outputted from the printer 1. When the input image data D1 is input to the route 2, the input image data D1 is converted into Lab intermediate data α in conversion characteristics S, the Lab intermediate data α is converted into RGB intermediate data β in conversion characteristics $S^{-1} \cdot X \cdot Y^{-1}$, and the RGB intermediate data β is converted into third calorimetric data C3 in conversion characteristics Y, and the resultant third calorimetric data C3 is outputted from the printer 1. So, the third calorimetric data C3 is the same as the first calorimetric data C1.

In the method for setting the color conversion condition according to the embodiment, the second three-dimensional LUT 301 is gray-axis corrected to ensure that, when Lab intermediate image data α is converted by the gray-axis corrected second three-dimensional LUT 301 into KGB intermediate image data β, Lab coordinates which satisfy a condition of a*=b*=0 in the L*a*b* color space (corresponding to gray colors) will be converted into KGB coordinates which satisfy a condition of R=G=B in the RGB color space (also corresponding to gray colors).

Concerning RGB input values which satisfy the condition of R=G=B, the color conversion relationship between RGB intermediate image data β and second output image data D3 in the second-third color conversion unit 19 is matched with the color conversion relationship between RGB input image data D1 and first output image data D2 in the first color conversion unit 13. The relationship between the input values (values of R, G, and B) which satisfy the condition of R=G=B and output values (values of C, M, Y, and K) obtained by converting the values of R, G, and B is maintained equal between when converting input image data D1 into first output image data D2 by the first color conversion unit 13 and when converting intermediate image data β into second output image data D3 by the second-third color conversion unit 19.

Therefore, according to the method for setting the color conversion condition of the embodiment, output values (values of C, M, Y, and K) obtained by converting input values (values of R, G, and B) which satisfy the condition of R=G=B by the first color conversion unit 13 are equal to output values (values of C, M, Y, and K) obtained by converting the same input values sequentially by the second-first color conversion unit 15, second-second color conversion unit 17, and second-third color conversion unit 19. As a result, even after image forming characteristics of each color vary by aging or the like in the printer 1, colors of gray parts of a formed image corresponding to coordinates which satisfy the condition of R=G=B in input image data D1 not only look the same but also can have the same balance between values of C, M, Y, and K regardless of whether a user selects route 1 or 2. Accordingly, densities of gray look the same even after image forming characteristics of the printer 1 vary, regardless of whether the route 1 constituted by the first color conversion unit 13 or the route 2 constituted by the second-first color conversion unit 15, second-second color conversion unit 17, and second-third color conversion unit 19 is selected.

While the invention has been described in detail with reference to the embodiment thereof, it would be apparent to those skilled in the art that various changes and modifications may be made therein without departing from the spirit of the invention.

For example, in the above-described embodiment, the printer 1 and the PC 800 cooperate to form an image on a recording medium as shown in FIG. 3. However, the processings of PC 800 shown in FIG. 3 can be executed in the printer 1 by providing an appropriate display on the printer 1. In this case, all the processings in FIG. 3 are executed in the printer 1. Image data D0 as a source of print data can be transmitted to the printer 1 from the PC 800 or by a direct printing method in which a removable disk such as a USB memory is directly attached to the printer 1.

The printer 1 can be of any type, such as an inkjet printer, a laser printer that employs an electrophotographic method, or the like.

In the above description, the CIELAB color coordinate system and XYY color coordinate systems are employed as the color space independent of the printer engine 200. However, other various types of device-independent color space can be used. Examples of the device-independent color space include a CIELUV color coordinate system, and CIECAM02.

The output image data D2 and D3 are defined in the CMYK color space. However, the output image data D2 and D3 may be defined in other various types of multicolor color space including C, M, Y, and K and one or more other colors selected from a group of LC (light cyan), LM (light magenta), LY (light yellow), and LK (light black: gray).

For example, if the printer 1 is an inkjet printer which forms an image using a C ink, M ink, Y ink, and K ink, the output image data D2 and D3 is defined in the color space constituted by C, M, Y, and K. If the printer 1 is an inkjet printer which forms an image using a C ink, M ink, Y ink, K ink, LC ink, LM ink, LY ink, and LK ink, the output image data D2 and D3 is defined in a color space constituted by C, M, Y, K, LC, LM, LY, and LK.

Similarly, if the printer 1 is a laser printer which forms an image using toner of colors C, N, Y, and K, the output image data D2 and D3 is defined in the color space constituted by C, M, Y, and K. If the printer 1 is a color laser printer which forms an image using toner of colors C, M, Y, K, LC, LM, LY, and LK, the output image data D2 and D3 is defined in a color space constituted by C, M, Y, K, LC, LM, LY, and LK.

The programs of FIGS. 9 and 12 may be distributed to a user. For example, the programs of FIGS. 9 and 12 may be originally stored in a computer readable medium, such as a CD-ROM, and may be downloaded to the HDD 814 of the PC 800, and may be executed by the PC 800.

What is claimed is:

1. A method for setting a color conversion condition for use in an image forming device, the image forming device including:

a first color conversion unit that converts input image data expressed in a RGB color space into first output image data expressed in a multicolor color space including C, M, Y, and K, by using a first three-dimensional LUT;

a second-first color conversion unit that converts the input image data into intermediate image data α expressed in a device-independent color space, by using a predetermined conversion method, with a color conversion relationship between the input image data and the intermediate image data α being set as a color conversion relationship S;

a second-second color conversion unit that converts the intermediate image data α into intermediate image data β expressed in the RGB color space, by using a second three-dimensional LUT;

a second-third color conversion unit that converts the intermediate image data β into second output image data expressed in the multicolor color space including C, M, Y, and K, by using a conversion processing for conversion from the RGB color space into the multicolor color space including C, M, Y, and K without using a multi-dimensional LUT; and an image forming unit that is configured to form an image based on the first output image data if the image forming unit receives the first output image data and to form an image based on the second output image data if the image forming unit receives the second output image data, the method comprising:

obtaining a color conversion relationship X between the input image data and first colorimetric data of an image that is formed on the basis of the first output image data that is obtained by converting the input image data by the first color conversion unit;

obtaining a color conversion relationship Y between the intermediate image data β and second colorimetric data of an image that is formed on the basis of the second output image data that is obtained by converting the intermediate image data β the same as the input image data by the second-third color conversion unit; and setting, in a form of values expressing a color conversion relationship on the second three-dimensional LUT, a relationship between the intermediate image data α and the intermediate image data β, by using the color conversion relationship S, the color conversion relationship X, and the color conversion relationship Y, to ensure that first colorimetric data of an image formed on the basis of the first output image data obtained by converting the input image data by the first color conversion unit is equal to third colorimetric data of an image that is formed on the basis of the second output image data obtained by sequentially converting the same input image data by the second-first color conversion unit, the second-second color conversion unit, and the second-third color conversion unit, wherein the relationship between the intermediate image data α and the intermediate image data β in the second three-dimensional LUT is set to have conversion characteristics represented by $S^{-1} \cdot X \cdot Y^{-1}$.

2. A method for setting a color conversion condition, according to claim 1, wherein the obtaining the color conversion relationship X comprises:
  inputting the input image data into the first color conversion unit, thereby converting the input image data into first output image data by the first color conversion unit;
  inputting the first output image data into the image forming unit, thereby forming an image based on the first output image data; and
  measuring the image to determine the first colorimetric data, and
  wherein the obtaining the color conversion relationship Y comprises:
  inputting the intermediate image data β, which is the same as the input image data that is inputted into the first color conversion unit, into the second-third color conversion unit, thereby converting the intermediate image data β into second output image data;
  inputting the second output image data into the image forming unit, thereby forming another image based on the second output image data; and
  measuring the another image to determine the second colorimetric data.

3. A method for setting a color conversion condition, according to claim 2, wherein the setting the relationship between the intermediate image data α and the intermediate image data β comprises:
  converting the first colorimetric data into ideal intermediate image data β ideal by using an inverse relationship $Y^{-1}$ of the color conversion relationship Y;
  converting the ideal intermediate image data β ideal into second ideal colorimetric data by using the color conversion relationship Y;
  setting first ideal colorimetric data as equal to the second ideal colorimetric data;
  converting the first ideal colorimetric data into ideal input image data by using an inverse conversion relationship $X^{-1}$ of the conversion relationship X;
  inputting the ideal input image data to the second-first color conversion unit, thereby converting the ideal input image into ideal intermediate image data α ideal;
  setting a conversion relationship from the ideal intermediate image data β ideal to the ideal intermediate image data α ideal;
determining a conversion relationship from the ideal intermediate image data α ideal to the ideal intermediate image data β ideal as an inverse relationship of the conversion relationship from the ideal intermediate image data β ideal to the ideal intermediate image data α ideal; and
  setting the conversion relationship from the ideal intermediate image data α ideal to the ideal intermediate image data β ideal as the relationship between the intermediate image data α and the intermediate image data β.

4. A method for setting a color conversion condition, according to claim 1, wherein the second-third color conversion unit converts the intermediate image data β into the second output image data expressed in the multicolor color space including C, M, Y, and K, by using the conversion processing for conversion from the RGB color space into the multicolor color space including C, M, Y, and K by using one-dimensional tables.

5. A method for setting a color conversion condition, according to claim 1, further comprising:
  after setting the color conversion relationship of the second three-dimensional LUT,
  correcting values of R, G, and B, which are in the second three-dimensional LUT and which correspond to values expressing an achromatic color in the device-independent color space, to values that satisfy a condition of R=G=B;
  obtaining a color conversion relationship Z between coordinates which satisfy the condition of R=G=B in the RGB color space and coordinates in the multicolor color space including C, M, Y, and K which are obtained by converting the coordinates which satisfy the condition of R=G=B by using the first three-dimensional LUT; and
  correcting the conversion processing in the second-third color conversion unit for the intermediate image data β that satisfies the condition of R=G=B in the RGB color space to ensure that the intermediate image data β that satisfies the condition of R=G=B in the RGB color space and the second output image data satisfy the color conversion relationship Z.

6. An image forming apparatus, comprising:
  a first color conversion unit that converts input image data expressed in a RGB color space into first output image data expressed in a multicolor color space including C, M, Y, and K, by using a first three-dimensional LUT, a color conversion relationship X being defined between the input image data and first colorimetric data of an image formed on the basis of the first output image data;
  a second-first color conversion unit that converts the input image data into intermediate image data α expressed in a device-independent color space, by using a predetermined conversion method, with a color conversion relationship between the input image data and the intermediate image data α being set as a color conversion relationship S;
  a second-second color conversion unit that converts the intermediate image data α into intermediate image data β expressed in the RGB color space, by using a second three-dimensional LUT;
  a second-third color conversion unit that converts the intermediate image data β into second output image data expressed in the multicolor color space including C, M, Y, and K, by using a conversion processing for conversion from the RGB color space into the multicolor color space including C, M, Y, and K without using a multidimensional LUT, a color conversion relationship Y being defined between the intermediate image data β and second colorimetric data of an image that is formed on the basis of the second output image data that is obtained by converting the intermediate image data β the same as the input image data by the second-third color conversion unit; and
  an image forming unit that is configured to form an image based on the first output image data if the image forming unit receives the first output image data and to form an image based on the second output image data if the image forming unit receives the second output image data,
  the second three-dimensional LUT indicating a relationship between the intermediate image data α and the intermediate image data β, the relationship between the intermediate image data α and the intermediate image data β being dependent on the color conversion relationship S, the color conversion relationship X, and the color conversion relationship Y, thereby ensuring that first colorimetric data of an image formed on the basis of the first output image data obtained by converting the input image data by the first color conversion unit is equal to third colorimetric data of an image that is formed on the basis of the second output image data obtained by sequentially converting the same input image data by the second-first color conversion unit, the second-second color conversion unit, and the second-third color conversion unit, wherein the second three-dimensional LUT indicates the relationship between the intermediate image data α and the intermediate image data β, the relationship being represented by $S^{-1} \cdot X \cdot Y^{-1}$.

7. An image forming apparatus according to claim 6, further comprising a selection unit selecting either one of a first process of converting the input image data by the first color conversion unit and a second process of sequentially converting the input image data by the second-first color conversion unit, the second-second color conversion unit, and the second-third color conversion unit.

8. An image forming apparatus, according to claim 6, wherein the second-third color conversion unit converts the intermediate image data β into the second output image data expressed in the multicolor color space including C, M, Y, and K, by using the conversion processing for conversion from the RGB color space into the multicolor color space including C, M, Y, and K by using one-dimensional tables.

9. An image forming apparatus, according to claim 6, wherein the second-second color conversion unit converts the intermediate image data α into intermediate image data β expressed in the RGB color space, by using a selected one of the second three-dimensional LUT and another second three-dimensional LUT.

10. An image forming apparatus according to claim 6, wherein values of R, G, and B, which are in the second three-dimensional LUT and which correspond to values expressing an achromatic color in the device-independent color space, are corrected to satisfy a condition of R=G=B, wherein if the intermediate image data 0 fails to satisfy the condition of R=G=B in the RGB color space, the second-third color conversion unit converts the intermediate image data β into second output image data expressed in the multicolor color space including C, M, Y, and K, by using the conversion processing, and wherein if the intermediate image data β satisfies the condition of R=G=B in the RGB color space, the second-third color conversion unit converts the intermediate image data β into second output image data expressed in the multicolor color space including C, M, Y, and K, by using a color conversion relationship Z between RGB coordinates which satisfy the condition of R=G=B in the RGB color space and CMYK coordinates in the multicolor color space including C, M, Y, and K which are obtained by converting the RGB coordinates which satisfy the condition of R=G=B by using the first three-dimensional LUT.

11. A non-transitory computer readable storage medium storing a set of program instructions executable on a data processing device and usable for setting a color conversion condition for use in an image forming device, the image forming device including:

a first color conversion unit that converts input image data expressed in a RGB color space into first output image data expressed in a multicolor color space including C, M, Y, and K, by using a first three-dimensional LUT;

a second-first color conversion unit that converts the input image data into intermediate image data α expressed in a device-independent color space, by using a predetermined conversion method, with a color conversion relationship between the input image data and the intermediate image data α being set as a color conversion relationship S;

a second-second color conversion unit that converts the intermediate image data α into intermediate image data β expressed in the RGB color space, by using a second three-dimensional LUT;

a second-third color conversion unit that converts the intermediate image data β into second output image data expressed in the multicolor color space including C, M, Y, and K, by using a conversion processing for conversion from the RGB color space into the multicolor color space including C, M, Y, and K without using a multi-dimensional LUT; and an image forming unit that is configured to form an image based on the first output image data if the image forming unit receives the first output image data and to form an image based on the second output image data if the image forming unit receives the second output image data, the instructions comprising:

obtaining a color conversion relationship X between the input image data and first colorimetric data of an image that is formed on the basis of the first output image data that is obtained by converting the input image data by the first color conversion unit;

obtaining a color conversion relationship Y between the intermediate image data β and second colorimetric data of an image that is formed on the basis of the second output image data that is obtained by converting the intermediate image data β the same as the input image data by the second-third color conversion unit; and setting, in a form of values expressing a color conversion relationship on the second three-dimensional LUT, a relationship between the intermediate image data α and the intermediate image data β, by using the color conversion relationship S, the color conversion relationship X, and the color conversion relationship Y, to ensure that first colorimetric data of an image formed on the basis of the first output image data obtained by converting the input image data by the first color conversion unit is equal to third colorimetric data of an image that is formed on the basis of the second output image data obtained by sequentially converting the same input image data by the second-first color conversion unit, the second-second color conversion unit, and the second-third color conversion unit, wherein the relationship between the intermediate image data α and the intermediate image data β in the second three-dimensional LUT is set to have conversion characteristics represented by $S^{-1} \cdot X \cdot Y^{-1}$.

12. A non-transitory computer readable storage medium, according to claim 11, wherein the instructions further comprising:

after setting the color conversion relationship of the second three-dimensional LUT, correcting values of R, G, and B, which are in the second three-dimensional LUT and which correspond to values expressing an achromatic color in the device-independent color space, to values that satisfy a condition of R=G=B;

obtaining a color conversion relationship Z between coordinates which satisfy the condition of R=G=B in the RGB color space and coordinates in the multicolor color space including C, M, Y, and K which are obtained by converting the coordinates which satisfy the condition of R=G=B by using the first three-dimensional LUT; and correcting the conversion processing in the second-third color conversion unit for the intermediate image data β that satisfies the condition of R=G=B in the RGB color space to ensure that the intermediate image data β that satisfies the condition of R=G=B in the RGB color space and the second output image data satisfy the color conversion relationship Z.

* * * * *